US012062515B2

(12) United States Patent
Douglass et al.

(10) Patent No.: US 12,062,515 B2
(45) Date of Patent: Aug. 13, 2024

(54) COMPACT HIGH VOLTAGE POWER FUSE AND METHODS OF MANUFACTURE

(71) Applicant: EATON INTELLIGENT POWER LIMITED, Dublin (IE)

(72) Inventors: Robert Stephen Douglass, Wildwood, MO (US); John Michael Fink, Chesterfield, MO (US)

(73) Assignee: Eaton Intelligent Power Limited, Dublin (IE)

( * ) Notice: Subject to any disclaimer, the term of this patent is extended or adjusted under 35 U.S.C. 154(b) by 850 days.

(21) Appl. No.: 16/668,600

(22) Filed: Oct. 30, 2019

(65) Prior Publication Data

US 2020/0090892 A1 Mar. 19, 2020

Related U.S. Application Data

(60) Division of application No. 14/321,038, filed on Jul. 1, 2014, now Pat. No. 11,075,047, which is a (Continued)

(51) Int. Cl.
*H01H 85/055* (2006.01)
*H01H 69/02* (2006.01)

(Continued)

(52) U.S. Cl.
CPC .......... *H01H 85/055* (2013.01); *H01H 69/02* (2013.01); *H01H 85/0456* (2013.01);

(Continued)

(58) Field of Classification Search
CPC .. H01H 85/055; H01H 85/0456; H01H 85/10; H01H 85/11; H01H 85/12;

(Continued)

(56) References Cited

U.S. PATENT DOCUMENTS

| | | | | |
|---|---|---|---|---|
| 480,802 A | | 8/1892 | Blathy | |
| 3,394,333 A | * | 7/1968 | Jacobs, Jr. | H01H 85/10 337/276 |

(Continued)

FOREIGN PATENT DOCUMENTS

| | | | | |
|---|---|---|---|---|
| GB | 674973 A | | 7/1952 | |
| GB | 1555278 A | * | 11/1979 | H01H 85/06 |

(Continued)

OTHER PUBLICATIONS

Japanese Office Action for related Application No. 2016562236, dated Dec. 27, 2019, 6 Pages.

(Continued)

*Primary Examiner* — Jeffrey T Carley
*Assistant Examiner* — Jose K Abraham
(74) *Attorney, Agent, or Firm* — Baker Botts L.L.P.

(57) ABSTRACT

Method of manufacturing a high voltage power fuse having a dramatically reduced size facilitated by silicated filler material, a formed fuse element geometry, arc barrier materials and single piece terminal fabrications. The method includes: connecting a full-range fuse element assembly including first and second metal strip fuse elements defining a plurality of weak spots therein and being connected in parallel to one another, the first metal strip fuse element configured to uniquely respond to a short circuit current condition and the second metal strip fuse element configured to uniquely respond to an overload current condition and a set of arc barriers at selected locations to surround respective cross sectional portions are disclosed.

8 Claims, 19 Drawing Sheets

Related U.S. Application Data continuation-in-part of application No. 14/289,032, filed on May 28, 2014, now Pat. No. 11,075,048.

(51) Int. Cl.

| | |
|---|---|
| ***H01H 85/045*** | (2006.01) |
| ***H01H 85/10*** | (2006.01) |
| ***H01H 85/11*** | (2006.01) |
| ***H01H 85/12*** | (2006.01) |
| ***H01H 85/143*** | (2006.01) |
| ***H01H 85/175*** | (2006.01) |
| ***H01H 85/18*** | (2006.01) |
| ***H01H 85/20*** | (2006.01) |

(52) U.S. Cl.

CPC ............ *H01H 85/10* (2013.01); *H01H 85/11* (2013.01); *H01H 85/12* (2013.01); *H01H 85/175* (2013.01); *H01H 85/203* (2013.01); *H01H 85/143* (2013.01); *H01H 85/18* (2013.01); *H01H 2239/044* (2013.01); *Y10T 29/49108* (2015.01)

(58) Field of Classification Search

CPC .. H01H 85/175; H01H 85/203; H01H 85/143; H01H 85/18; H01H 69/02; Y10T 29/49107

USPC ............................................................ 29/623

See application file for complete search history.

(56) References Cited

U.S. PATENT DOCUMENTS

| | | | | | |
|---|---|---|---|---|---|
| 3,460,085 | A | | 8/1969 | McAllister et al. | |
| 3,601,737 | A | * | 8/1971 | Baird | H01H 85/055 337/159 |
| 3,636,491 | A | | 1/1972 | Cameron | |
| 3,743,994 | A | | 7/1973 | Kozacka | |
| 3,766,509 | A | | 10/1973 | Cameron | |
| 3,777,370 | A | | 12/1973 | Wakui | |
| 3,810,062 | A | | 5/1974 | Kozacka | |
| 3,843,948 | A | | 10/1974 | Kozacka | |
| 4,032,879 | A | * | 6/1977 | Monagan | H01H 85/42 337/281 |
| 4,198,615 | A | | 4/1980 | Mahieu | |
| 4,219,795 | A | | 8/1980 | Panaro et al. | |
| 4,319,213 | A | | 3/1982 | Reid | |
| 4,320,374 | A | | 3/1982 | Narancic et al. | |
| 4,417,224 | A | | 11/1983 | Ross | |
| 4,479,105 | A | | 10/1984 | Banes | |
| 4,486,734 | A | | 12/1984 | Each | |
| 4,646,053 | A | | 2/1987 | Mosesian | |
| 4,656,453 | A | | 4/1987 | Reeder | |
| 4,893,106 | A | | 1/1990 | Goldstein et al. | |
| 4,951,026 | A | | 8/1990 | Ehlmann | |
| 4,972,170 | A | | 11/1990 | Ehlmann et al. | |
| 5,148,140 | A | | 9/1992 | Goldstein | |
| 5,245,308 | A | * | 9/1993 | Herbias | H01H 85/38 337/276 |
| 5,247,274 | A | | 9/1993 | Gurevich | |
| 5,252,942 | A | | 10/1993 | Gurevich | |
| 5,270,679 | A | | 12/1993 | Gulbrandsen | |
| 5,296,832 | A | | 3/1994 | Perreault et al. | |
| 5,345,210 | A | * | 9/1994 | Swensen | H01H 85/38 337/166 |
| 5,426,411 | A | * | 6/1995 | Pimpis | H01H 85/165 337/186 |
| 5,559,489 | A | * | 9/1996 | Weiden | H01H 85/205 361/833 |
| 5,596,306 | A | * | 1/1997 | Kowalik | H01H 85/38 337/165 |
| 5,670,926 | A | | 9/1997 | Ranjan et al. | |
| 5,714,923 | A | * | 2/1998 | Shea | H01H 85/055 337/159 |
| 5,736,918 | A | * | 4/1998 | Douglass | H01H 85/18 337/248 |
| 5,905,426 | A | * | 5/1999 | Douglass | H01H 85/18 337/260 |
| 5,963,123 | A | * | 10/1999 | Douglass | H01H 85/153 337/248 |
| 6,160,471 | A | | 12/2000 | Rybka et al. | |
| 6,194,989 | B1 | * | 2/2001 | Douglass | H01H 85/10 337/260 |
| 6,462,925 | B2 | | 10/2002 | Kanamaru et al. | |
| 6,507,265 | B1 | | 1/2003 | Ackermann | |
| 6,590,490 | B2 | | 7/2003 | Ackermann | |
| 6,642,833 | B2 | | 11/2003 | Ranjan et al. | |
| 6,664,886 | B2 | | 12/2003 | Ackermann | |
| 6,888,440 | B2 | | 5/2005 | Ackermann | |
| 9,911,566 | B2 | | 3/2018 | Retardo et al. | |
| 11,075,047 | B2 | | 7/2021 | Douglass et al. | |
| 2005/0083167 | A1 | * | 4/2005 | Ackermann | H01H 85/055 337/273 |
| 2007/0132539 | A1 | | 6/2007 | Richter et al. | |
| 2007/0159291 | A1 | | 7/2007 | Wilniewczyc et al. | |
| 2008/0242150 | A1 | * | 10/2008 | Chikamatsu | H01H 85/54 337/237 |
| 2010/0164677 | A1 | | 7/2010 | Yang | |
| 2010/0194519 | A1 | * | 8/2010 | Harris | H01H 85/045 337/227 |
| 2011/0298577 | A1 | | 12/2011 | Enriquez et al. | |

FOREIGN PATENT DOCUMENTS

| | | | | | |
|---|---|---|---|---|---|
| GB | 1555278 | A | | 11/1979 | |
| JP | 389864 | A | | 10/1960 | |
| JP | 53115053 | A | | 10/1978 | |
| JP | 5426454 | A | | 2/1979 | |
| JP | 5650044 | U | | 5/1981 | |
| JP | 581942 | A | | 1/1983 | |
| JP | S61224233 | A | | 10/1986 | |
| JP | 757613 | A | | 3/1995 | |
| JP | 2014007134 | A | | 3/1995 | |
| JP | 2002343225 | A | | 11/2002 | |
| JP | 2014054102 | A | | 3/2014 | |
| JP | 2016085939 | A | | 5/2016 | |
| KR | 20000005820 | A | | 1/2000 | |
| KR | 20130024244 | A | | 3/2013 | |
| KR | 20150045382 | A | | 4/2015 | |
| WO | WO-9641360 | A1 | * | 12/1996 | H01H 85/055 |
| WO | 2014037787 | A2 | | 3/2014 | |
| WO | 2015183805 | A1 | | 12/2015 | |

OTHER PUBLICATIONS

Loctite® SI 5088 TM, Technical Data Sheet, Henkel, May 2014, 3 pages.

U.S. Appl. No. 14/289,032, filed May 28, 2014.

International Search Report and Written Opinion of International Application No. PCT/US2015/032422, Aug. 31, 2015, 15 pages.

EV Fuse; EVFP; Pacific Engineering Corporation; http://www.pecj.co.jp/en/fuse/ev/ev.html; downloaded Jun. 27, 2014; 2 pages.

* cited by examiner

COMPACT HIGH VOLTAGE POWER FUSE AND METHODS OF MANUFACTURE

CROSS REFERENCE TO RELATED APPLICATIONS

This application is a divisional application of U.S. application Ser. No. 14/321,038 filed Jul. 1, 2014, which is a continuation-in-part application of U.S. application Ser. No. 14/289,032 filed May 28, 2014, the complete disclosures of which are hereby incorporated by reference in their entirety.

BACKGROUND OF THE INVENTION

The field of the invention relates generally to electrical circuit protection fuses and methods of manufacture, and more specifically to the manufacture of high voltage, full-range power fuses.

Fuses are widely used as overcurrent protection devices to prevent costly damage to electrical circuits. Fuse terminals typically form an electrical connection between an electrical power source or power supply and an electrical component or a combination of components arranged in an electrical circuit. One or more fusible links or elements, or a fuse element assembly, is connected between the fuse terminals, so that when electrical current flow through the fuse exceeds a predetermined limit, the fusible elements melt and opens one or more circuits through the fuse to prevent electrical component damage.

So-called full-range power fuses are operable in high voltage power distributions to safely interrupt both relatively high fault currents and relatively low fault currents with equal effectiveness. In view of constantly expanding variations of electrical power systems, known fuses of this type are disadvantaged in some aspects. Improvements in full-range power fuses are desired to meet the needs of the marketplace.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
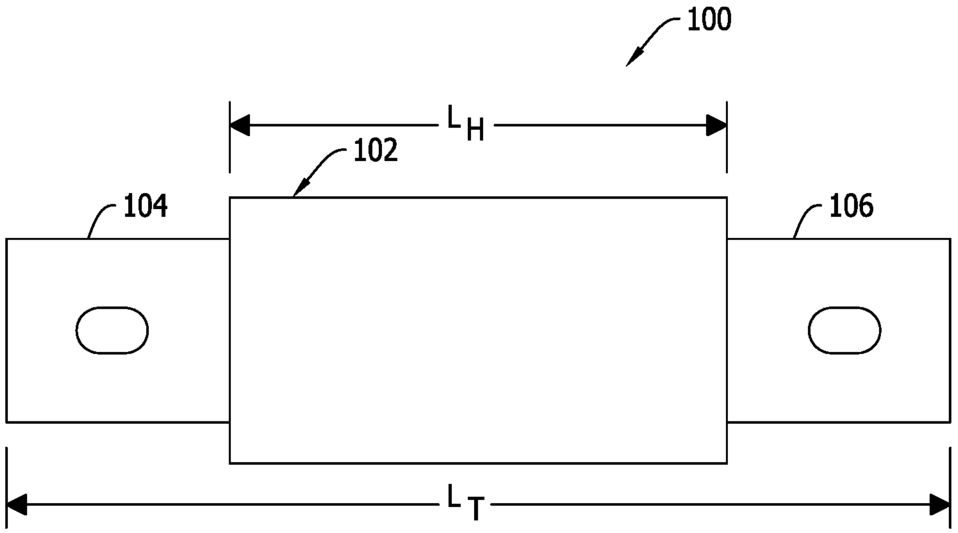
FIG. 1 (Prior Art)
FIG. 1 is a side elevational view of a known high voltage power fuse.

Recent advancements in electric vehicle technologies, among other things, present unique challenges to fuse manufacturers. Electric vehicle manufacturers are seeking fusible circuit protection for electrical power distribution systems operating at voltages much higher than conventional electrical power distribution systems for vehicles, while simultaneously seeking smaller fuses to meet electric vehicle specifications and demands.

Electrical power systems for conventional, internal combustion engine-powered vehicles operate at relatively low voltages, typically at or below about 48 VDC. Electrical power systems for electric-powered vehicles, referred to herein as electric vehicles (EVs), however, operate at much higher voltages. The relatively high voltage systems (e.g., 200 VDC and above) of EVs generally enables the batteries to store more energy from a power source and provide more energy to an electric motor of the vehicle with lower losses (e.g., heat loss) than conventional batteries storing energy at 12 volts or 24 volts used with internal combustion engines, and more recent 48 volt power systems.

EV original equipment manufacturers (OEMs) employ circuit protection fuses to protect electrical loads in all-battery electric vehicles (BEVs), hybrid electric vehicles (HEVs) and plug-in hybrid electric vehicles (PHEVs). Across each EV type, EV manufacturers seek to maximize the mileage range of the EV per battery charge while reducing cost of ownership. Accomplishing these objectives turns on the energy storage and power delivery of the EV system, as well as the size, volume and mass of the vehicle components that are carried by the power system. Smaller and/or lighter vehicles will more effectively meet these demands than larger and heavier vehicles, and as such all EV components are now being scrutinized for potential size, weight, and cost savings.

Generally speaking, larger components tend to have higher associated material costs, tend to increase the overall size of the EV or occupy an undue amount of space in a shrinking vehicle volume, and tend to introduce greater mass that directly reduces the vehicle mileage per single battery charge. Known high voltage circuit protection fuses are, however, relatively large and relatively heavy components. Historically, and for good reason, circuit protection fuses have tended to increase in size to meet the demands of high voltage power systems as opposed to lower voltage systems. As such, existing fuses needed to protect high voltage EV power systems are much larger than the existing fuses needed to protect the lower voltage power systems of conventional, internal combustion engine-powered vehicles. Smaller and lighter high voltage power fuses are desired to meet the needs of EV manufacturers, without sacrificing circuit protection performance.

Electrical power systems for state of the art EVs may operate at voltages as high as 450 VDC. The increased power system voltage desirably delivers more power to the EV per battery charge. Operating conditions of electrical fuses in such high voltage power systems is much more severe, however, than lower voltage systems. Specifically, specifications relating to electrical arcing conditions as the fuse opens can be particularly difficult to meet for higher voltage power systems, especially when coupled with the industry preference for reduction in the size of electrical fuses. While known power fuses are presently available for use by EV OEMs in high voltage circuitry of state of the art EV applications, the size and weight, not to mention the cost, of conventional power fuses capable of meeting the requirements of high voltage power systems for EVs is impractically high for implementation in new EVs.

Providing relatively smaller power fuses that can capably handle high current and high battery voltages of state of the art EV power systems, while still providing acceptable interruption performance as the fuse element operates at high voltages is challenging, to say the least. Fuse manufacturers and EV manufactures would each benefit from smaller, lighter and lower cost fuses. While EV innovations are leading the markets desired for smaller, higher voltage fuses, the trend toward smaller, yet more powerful, electrical systems transcends the EV market. A variety of other power system applications would undoubtedly benefit from smaller fuses that otherwise offer comparable performance to larger, conventionally fabricated fuses. Improvements are needed to longstanding and unfulfilled needs in the art.

Exemplary embodiments of electrical circuit protection fuses are described below that address these and other difficulties. Relative to known high voltage power fuses, the exemplary fuse embodiments advantageously offer relatively smaller and more compact physical package size that, in turn, occupies a reduce physical volume or space in an EV. Also relative to known fuses, the exemplary fuse embodiments advantageously offer a relatively higher power handling capacity, higher voltage operation, full range time-current operation, lower short-circuit let-through energy performance, and longer life operation and reliability. As explained below, the exemplary fuse embodiments are designed and engineered to provide very high current limiting performance as well as long service life and high reliability from nuisance or premature fuse operation. Method aspects will be in part explicitly discussed and in part apparent from the discussion below.

While described in the context of EV applications and a particular type of fuse having certain ratings discussed below, the benefits of the invention are not necessarily limited to EV applications or to the particular fuse type or ratings described. Rather the benefits of the invention are believed to more broadly accrue to many different power system applications and can also be practiced in part or in whole to construct different types of fuses having similar or different ratings than those discussed herein.

Figure 2:
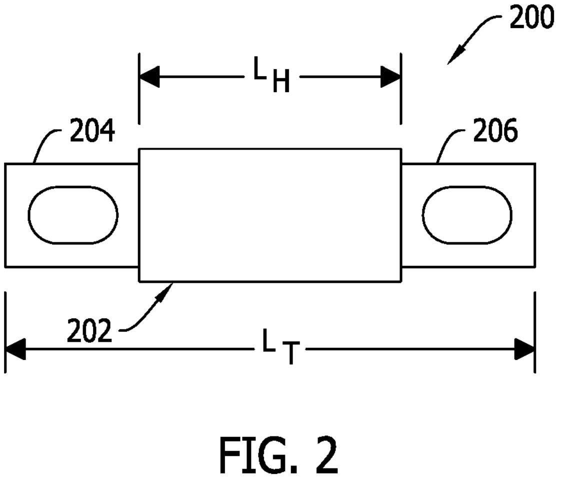
FIG. 2 is a side elevational view of an exemplary high voltage, full-range power fuse of the present invention.

FIG. 1 illustrates a known power fuse 100 whereas FIG. 2 illustrates a power fuse 200 formed in accordance with an exemplary embodiment of the present invention. The power fuse 100 in the example shown is a known UL Class J fuse and is constructed conventionally.

As shown in FIG. 1, the power fuse 100 includes a housing 102, terminal blades 104, 106 configured for connection to line and load side circuitry, and a fuse element assembly (not shown in FIG. 1) including one or more fuse elements that completes an electrical connection between the terminal blades 104, 106. When subjected to predetermined current conditions, the fuse element(s) melt, disintegrate, or otherwise structurally fail and opens the circuit path through the fuse element(s) between the terminal blades 104, 106. Load side circuitry is therefore electrically isolated from the line side circuitry, via operation of the fuse element (s), to protect load side circuit components and circuitry from damage when electrical fault conditions occur.

As shown in FIG. 2, the power fuse 200 of the invention includes a housing 202, terminal blades 204, 206 configured for connection to line and load side circuitry, and a fuse element assembly 208 (shown in FIGS. 4-8) that completes an electrical connection between the terminal blades 204, 206. When subjected to predetermined current conditions, at least a portion of the fuse element assembly 208 melts, disintegrates, or otherwise structurally fails and opens the circuit path between the terminal blades 204, 206. Load side circuitry is therefore electrically isolated from the line side circuitry to protect load side circuit components and circuit from damage when electrical fault conditions occur.

Both the fuses 100 and 200 are engineered to provide a voltage rating of 500 VDC and a current rating of 150 A. The dimensions of the fuses 100 and 200 are drastically different, however, as shown in Table 1 below wherein $L_H$ is the axial length of the housing of the fuse between its opposing ends, $R_H$ is the outer radius of the housing of the fuse, and $L_T$ is the total overall length of the fuse measured between the distal ends of the blade terminals that oppose one another on opposite sides of the housing.

TABLE 1

Fuse Package Size Reduction
Invention (Fuse 200) versus Prior Art (Fuse 100)

| Fuse | Housing Length ($L_H$) | Housing Radius ($R_H$) | Overall Total Length ($L_T$) |
|---|---|---|---|
| 100 | 3.0 in (76.2 mm) | 1.63 in. (41.4 mm) | 5.75 in. (146.05 mm) |
| 200 | 1.587 in. (40.31 mm) | 0.808 in. (20.52 mm) | 3.189 in. (81 mm) |
| Delta (Fuse 200 vs Fuse 100) | −1.415 in. (−35.89 mm) | −0.822 in (20.88 mm) | −2.561 in. 65.05 mm |
| % Reduction (Fuse 200 vs Fuse 100) | 47% | 50% | 46% |

Table 1 reveals an overall size reduction of about 50% in each of the dimensions tabulated for the power fuse 200 versus the fuse 100. While not tabulated in Table 1, the volume of the fuse 200 is reduced about 87% from the volume of the fuse 100. Thus, the fuse 200 offers significant size and volume reduction while otherwise offering comparable fuse protection performance to the fuse 100. The size and volume reduction of the fuse 200 further contributes to weight and cost savings via reduction of the materials utilized in its construction relative to the fuse 100. Accordingly, and because of its smaller dimensions the fuse 200 is much preferred for EV power system applications. The design and engineering of the fuse 200 that makes size and volume reductions possible will now be explained in detail.

Figure 3:
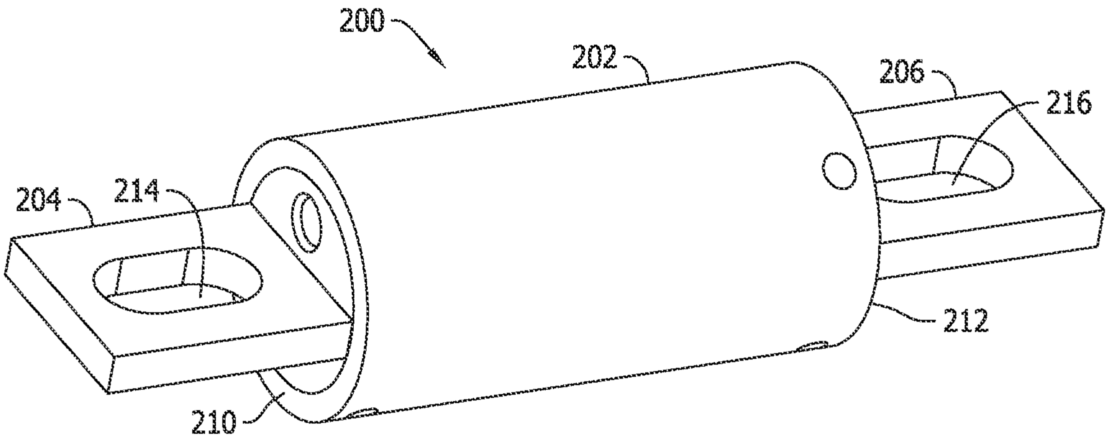
FIG. 3 is a perspective view of the exemplary power fuse shown in FIG. 2.
Figure 4:
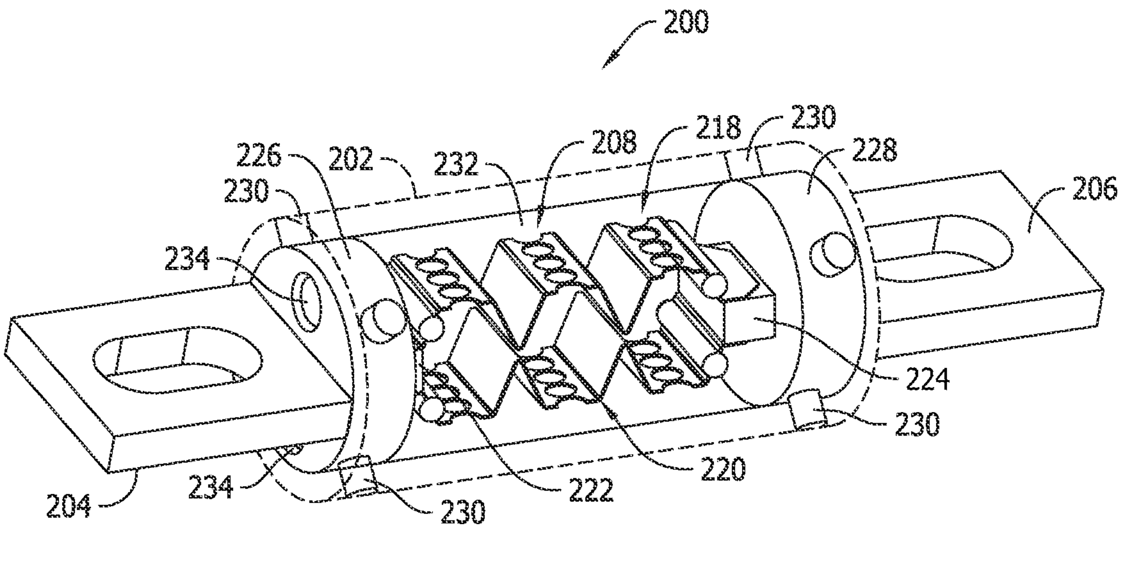
FIG. 4 is a view similar to FIG. 3 but revealing the internal construction of the power fuse shown in FIGS. 2 and 3.

FIGS. 3 and 4 are similar views of the exemplary power fuse 200, but a portion of the housing 202 is shown transparent in FIG. 4 to reveal the internal construction.

The housing 202 is fabricated from a non-conductive material known in the art such as glass melamine in one exemplary embodiment. Other known materials suitable for the housing 202 could alternatively be used in other embodiments as desired. Additionally, the housing 202 shown is generally cylindrical or tubular and has a generally circular cross-section along an axis perpendicular to the axial length dimensions $L_H$ and $L_T$ (FIG. 2) in the exemplary embodiment shown. The housing 202 may alternatively be formed in another shape if desired, however, including but not limited to a rectangular shape having four side walls arranged orthogonally to one another, and hence having a square or rectangular-shaped cross section. The housing 202 as shown includes a first end 210, a second end 212, and an internal bore or passageway between the opposing ends 210, 212 that receives and accommodates the fuse element assembly 208 (FIG. 4).

In some embodiments the housing 202 may be fabricated from an electrically conductive material if desired, although this would require insulating gaskets and the like to electrically isolate the terminal blades 204, 206 from the housing 202.

The terminal blades 204, 206 respectively extend in opposite directions from each opposing end 210, 212 of the housing 202 and are arranged to extend in a generally co-planar relationship with one another. Each of the terminal blades 204, 206 may be fabricated from an electrically conductive material such as copper or brass in contemplated embodiments. Other known conductive materials may alternatively be used in other embodiments as desired to form the terminal blades 204, 206. Each of the terminal blades 204, 206 is formed with an aperture 214, 216 as shown in FIG. 3, and the apertures 214, 216 may receive a fastener such as a bolt (not shown) to secure the fuse 200 in place in an EV and establish line and load side circuit connections to circuit conductors via the terminal blades 204, 206.

While exemplary terminal blades 204, 206 are shown and described for the fuse 200, other terminal structures and arrangements may likewise be utilized in further and/or alternative embodiments. For example, the apertures 214, 216 may be considered optional in some embodiments and may be omitted. Knife blade contacts may be provided in lieu of the terminal blades as shown, as well as ferrule terminals or end caps as those in the art would appreciate to provide various different types of termination options. The terminal blades 204, 206 may also be arranged in a spaced apart and generally parallel orientation if desired and may project from the housing 202 at different locations than those shown.

Figure 5:
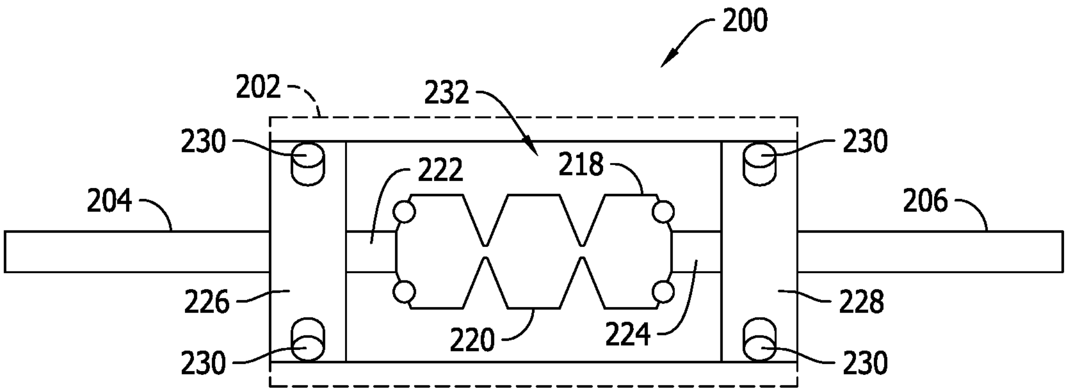
FIG. 5 is a side view of the power fuse shown in FIGS. 2-4 revealing the internal construction thereof.
Figure 6:
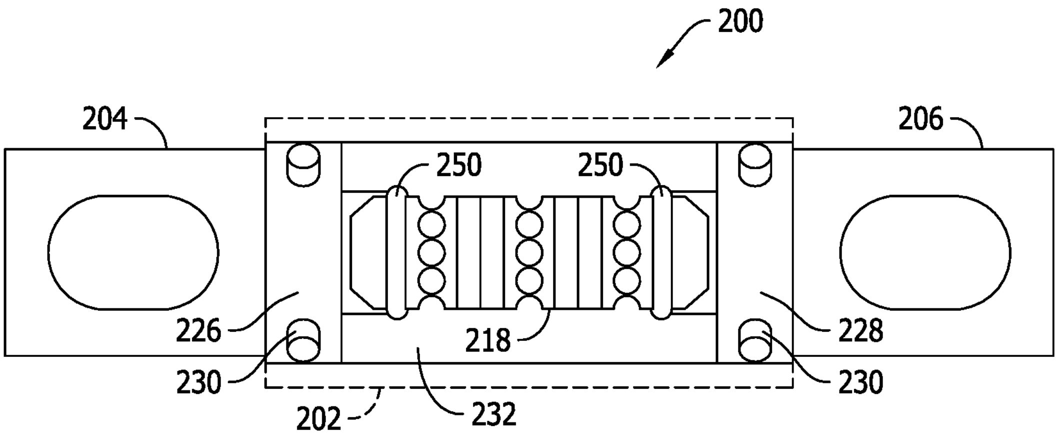
FIG. 6 is a top view of the power fuse shown in FIGS. 2-5 revealing the internal construction thereof.

FIGS. 4-6 illustrate various views wherein the fuse element assembly 208 can be seen from various vantage points through the portion of the hosing that is shown transparent. The fuse element assembly 208 includes a first fuse element 218 and a second fuse element 220 that each respectively connect to terminal contact blocks 222, 224 provided on end plates 226, 228. The end plates 226, 228 including the blocks 222, 224 are fabricated from an electrically conductive material such as cooper, brass or zinc, although other conductive materials are known and may likewise be utilized in other embodiments. Mechanical and electrical connections of the fuse elements 218, 210 and the terminal contact blocks 222, 224 may be established using known techniques, including but not limited to soldering techniques.

In various embodiments, the end plates 226, 228 may be formed to include the terminal blades 204, 206 or the terminal blades 204, 206 may be separately provided and attached. The end plates 226, 228 may be considered optional in some embodiments and connection between the fuse element assembly 208 and the terminal blades 204, 206 may be established in another manner.

A number of fixing pins 230 are also shown that secure the end plates 226, 228 in position relative to the housing 202. The fixing pins 230 in one example may be fabricated from steel, although other materials are known and may be utilized if desired. In some embodiments, the pins 230 may be considered optional and may be omitted in favor of other mechanical connection features.

An arc extinguishing filler medium or material 232 surrounds the fuse element assembly 208. The filler material 232 may be introduced to the housing 202 via one or more fill openings in one of the end plates 226, 228 that are sealed with plugs 234 (FIG. 4). The plugs 234 may be fabricated from steel, plastic or other materials in various embodiments. In other embodiments a fill hole or fill holes may be provided in other locations, including but not limited to the housing 202 to facilitate the introduction of the filler material 232.

In one contemplated embodiment, the filling medium 232 is composed of quartz silica sand and a sodium silicate binder. The quartz sand has a relatively high heat conduction and absorption capacity in its loose compacted state, but can be silicated to provide improved performance. For example, by adding a liquid sodium silicate solution to the sand and then drying off the free water, silicate filler material 232 may be obtained with the following advantages.

The silicate material 232 creates a thermal conduction bond of sodium silicate to the fuse elements 218 and 220, the quartz sand, the fuse housing 202, the end plates 226 and 228, and the terminal contact blocks 222, 224. This thermal bond allows for higher heat conduction from the fuse elements 218, 220 to their surroundings, circuit interfaces and conductors. The application of sodium silicate to the quartz sand aids with the conduction of heat energy out and away from the fuse elements 218, 220.

The sodium silicate mechanically binds the sand to the fuse element, terminal and housing tube increasing the thermal conduction between these materials. Conventionally, a filler material which may include sand only makes point contact with the conductive portions of the fuse elements in a fuse, whereas the silicated sand of the filler material 232 is mechanically bonded to the fuse elements. Much more efficient and effective thermal conduction is therefore made possible by the silicated filler material 232, which in part facilitates the substantial size reduction of the fuse 200 relative to known fuses offering comparable performance, including but not limited to the fuse 100 (FIG. 1).

Figure 7:
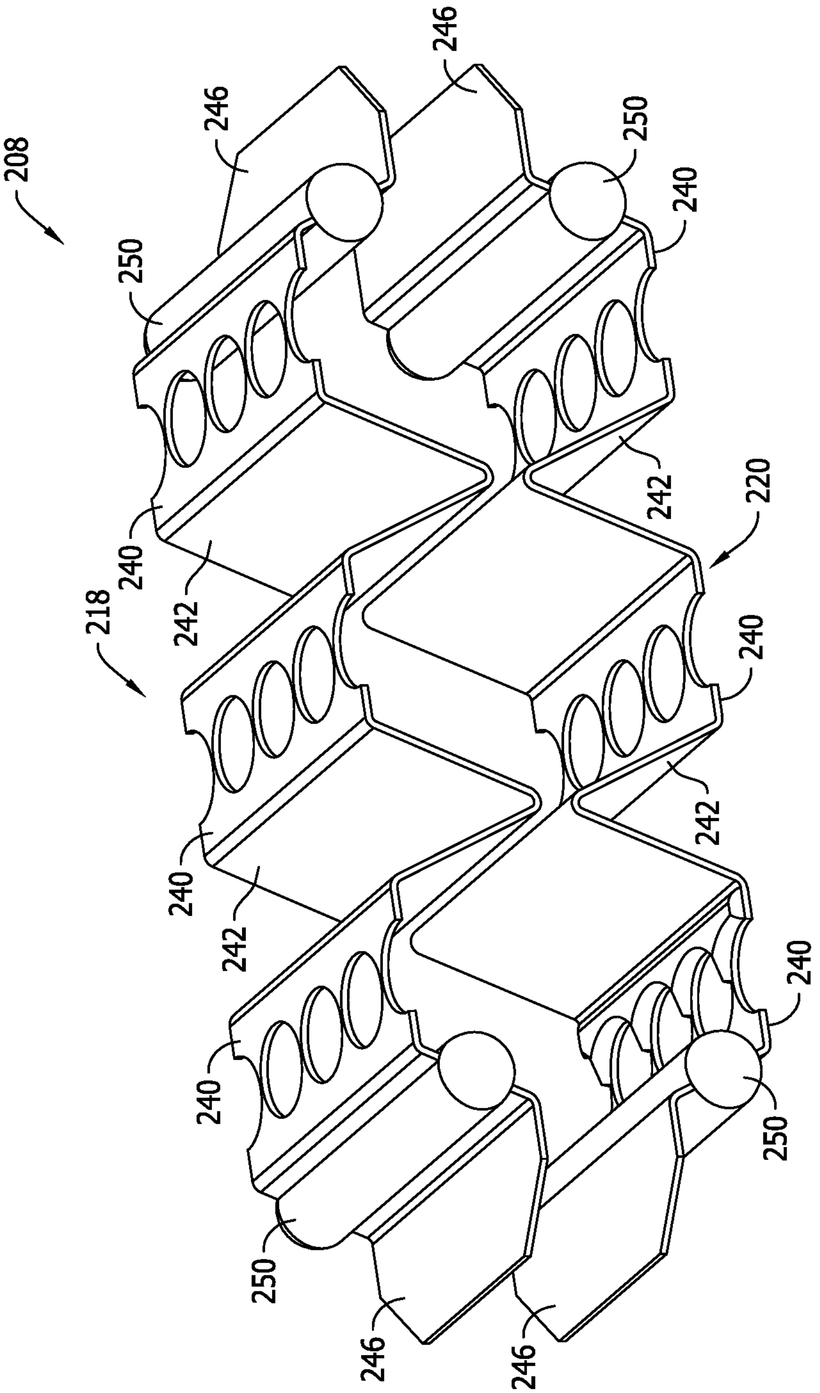
FIG. 7 is a perspective view of the fuse element assembly for the exemplary power fuse shown in FIGS. 2-6.

FIG. 7 illustrates the fuse element assembly 208 in further detail. The power fuse 200 can operate at higher system voltages due to the fuse element design features in the assembly 208, that further facilitate reduction in size of the fuse 200.

As shown in FIG. 7, each of the fuse elements 218, 220 is generally formed from a strip of electrically conductive material into a series of co-planar sections 240 connected by oblique sections 242, 244. The fuse elements 218, 220 are generally formed in substantially identical shapes and geometries, but inverted relative to one another in the assembly 208. That is, the fuse elements 218, 220 in the embodiment shown are arranged in a mirror image relation to one another. Alternatively stated, one of the fuse elements 218, 220 is oriented right-side up while the other is oriented up-side down, resulting in a rather compact and space saving construction. While a particular fuse element geometry and arrangement is shown, other types of fuse elements, fuse element geometries, and arrangements of fuse elements are possible in other embodiments. The fuse elements 218, 220 need not be identically formed to one another in all embodiments. Further, in some embodiments a single fuse element may be utilized.

In the exemplary fuse elements 218, 220 shown, the oblique sections 242, 244 are formed or bent out of plane from the planar sections 240, and the oblique sections 242 have an equal and opposite slope to the oblique sections 244. That is, one of the oblique sections 242 has a positive slope and the other of the oblique sections 244 has a negative slope in the example shown. The oblique sections 242, 244 are arranged in pairs between the planar sections 240 as shown. Terminal tabs 246 are shown on either opposed end of the fuse elements 218, 220 so that electrical connection to the end plates 226, 228 may be established as described above.

In the example shown, the planar sections 240 define a plurality of areas of reduced cross-sectional area, referred to in the art as weak spots. The weak spots are defined by round apertures in the planar sections 240 in the example shown. The weak spots correspond to the thinnest portion of the section 240 between adjacent apertures. The reduced cross-sectional areas at the weak spots will experience heat concentration as current flows through the fuse elements 218, 220, and the cross-sectional area of the weak spots is strategically selected to cause the fuse elements 218 and 220 to open at the location of the weak spots if specified electrical current conditions are experienced.

The plurality of the sections 240 and the plurality of weak spots provided in each section 240 facilitates arc division as the fuse elements operate. In the illustrated example, the fuse elements 218, 220 will simultaneously open at three locations corresponding to the sections 240 instead of one. Following the example illustrated, in a 450 VDC system, when the fuse elements operate to open the circuit through the fuse 200, an electrical arc will divide over the three locations of the sections 240 and the arc at each location will have the arc potential of 150 VDC instead of 450 VDC. The plurality of weak spots provided in each section 240 further effectively divides electrical arcing at the weak spots. The arc division allows a reduced amount of filler material 232, as well as a reduction in the radius of the housing 202 so that the size of the fuse 200 can be reduced.

The bent oblique sections 242, 244 between the planar sections 240 still provide a flat length for arcs to burn, but the bend angles should be carefully chosen to avoid a possibility that the arcs may combine at the corners where the sections 242, 244 intersect. The bent oblique sections 242, 244 also provide an effectively shorter length of the fuse element assembly 208 measured between the distal end of the terminal tabs 246 and in a direction parallel to the planar sections 240. The shorter effective length facilitates a reduction of the axial length of the housing of the fuse 200 that would otherwise be required if the fuse element did not include the bent sections 242, 244. The bent oblique sections 242, 244 also provide stress relief from manufacturing fatigue and thermal expansion fatigue from current cycling operation in use.

To maintain such a small fuse package with high power handling and high voltage operation aspects, special element treatments must be applied beyond the use of silicated quartz sand in the filler 232 and the formed fuse element geometries described above. In particular the application of arc blocking or arc barrier materials 250 such as room temperature vulcanizing (RTV) silicones or ultraviolet (UV) curing silicones are applied adjacent the terminal tabs 246 of the fuse elements 218, 220. Silicones yielding the highest percentage of silicon dioxide (silica) have been found to perform the best in blocking or mitigating arc burn back near the terminal tabs 246. Any arcing at the terminal tabs 246 is undesirable, and accordingly the arc blocking or barrier material 250 completely surrounds the entire cross section of the fuse elements 218, 220 at the locations provided so that arcing is prevented from reaching the terminal tabs 246.

Figure 8:
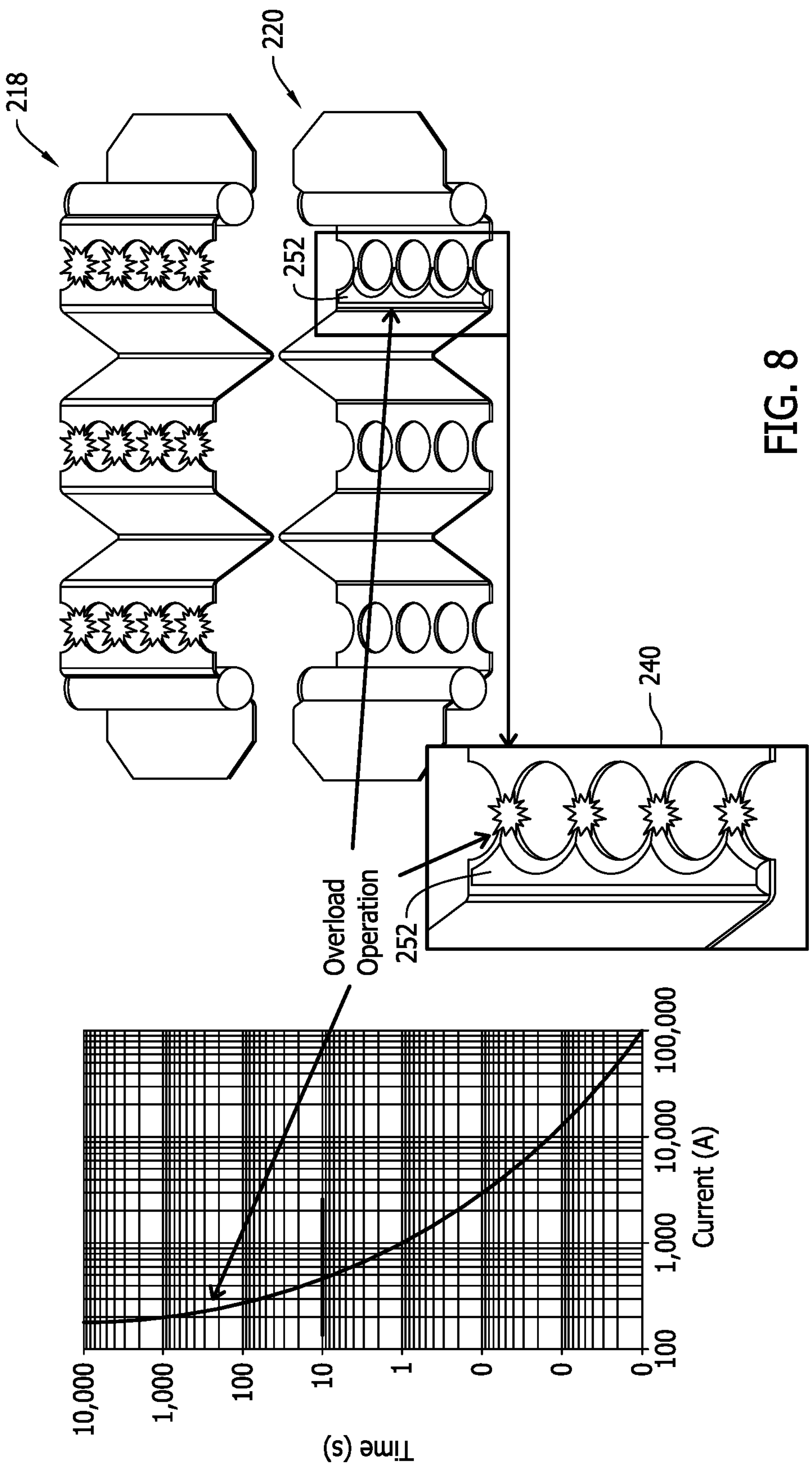
FIG. 8 is an assembly view of the fuse element assembly shown in FIG. 7 illustrating further details thereof.

Referring now to FIG. 8, full range time-current operation is achieved by employing two fuse element melting mechanisms, one mechanism for high current operation (or short circuit faults) and one mechanism for low current operation (or overload faults). As such, the fuse element 218 is sometimes referred to as a short circuit fuse element and the fuse element 220 is sometimes referred to as an overload fuse element.

The overload fuse element 220 includes a Metcalf effect (M-effect) coating 252 where pure tin (Sn) is applied to the fuse element, fabricated from copper (Cu) in this example, that extends proximate the weak spots of one of the sections 240. During overload heating the Sn and Cu diffuse together in an attempt to form a eutectic material. The result is a lower melting temperature somewhere between that of Cu and Sn or about 400° C. in contemplated embodiments. The overload fuse element 220 and the section 240 including the M-effect coating 252 will therefore respond to current conditions that will not affect the short circuit fuse element 218. While the M-effect coating 252 is applied to about one half of only one of the three sections 240 in the overload fuse element 220, the M-effect coating could be applied at additional ones of the sections 240 if desired. Further, the M-effect coating could be applied as spots only at the locations of the weak spots in another embodiment as opposed to a larger coating as shown in FIG. 8.

Figure 9:
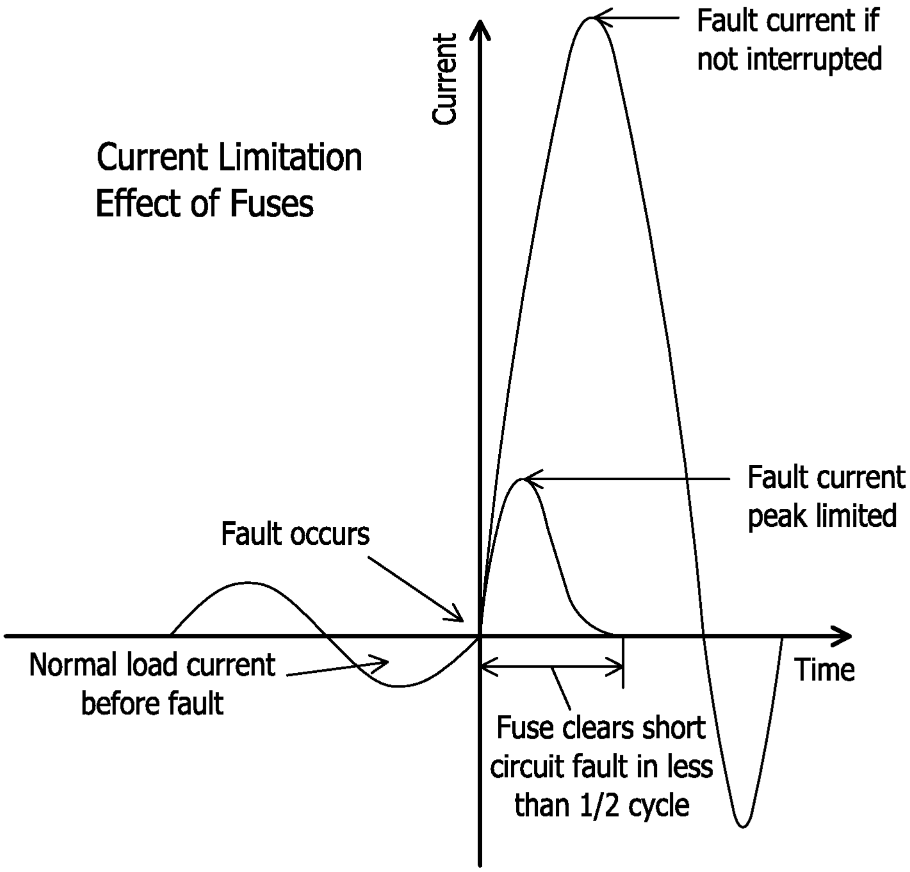
FIG. 9 illustrates an exemplary current limiting effect of the power fuse shown in FIGS. 2-6.

Lower short circuit let through energy is accomplished by reducing the fuse element melting cross section in the short circuit fuse element 218. This will normally have a negative effect on the fuse rating by lowering the rated ampacity due the added resistance and heat. Because the silicated sand filler material 232 more effectively removes heat from the fuse element 218, it compensates for the loss of ampacity that would otherwise result. An exemplary current limiting effect of the fuse 200 is shown in FIG. 9.

Figure 10:
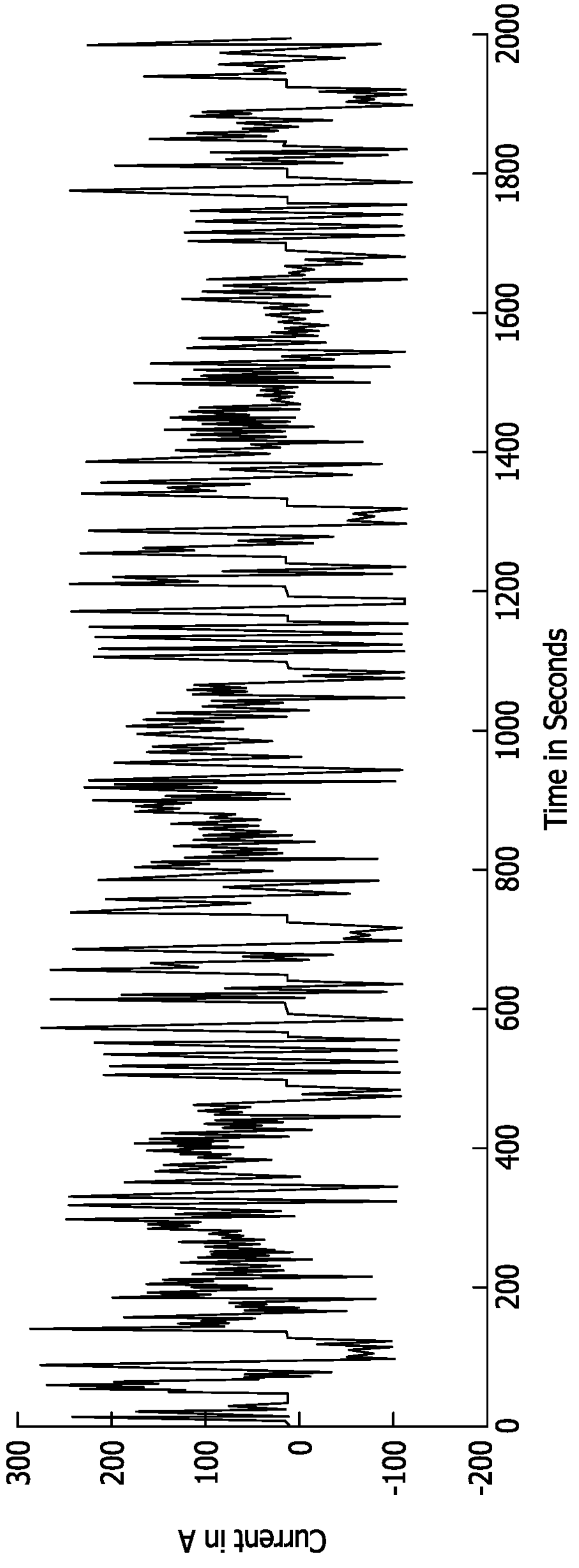
FIG. 10 illustrates an exemplary drive profile of an electric vehicle power system including the power fuse shown in FIGS. 2-6.

FIG. 10 illustrates an exemplary drive profile in an EV power system application that renders the fuse 200 susceptible to load current cycling fatigue. More specifically, thermal mechanical stress may develop in the fuse element weak spots mainly due to creep strain as the fuse 200 endures the drive profile. Heat generated in the fuse element weak spots is the primary mechanism leading to the onset of mechanical strain. The application of sodium silicate to the quartz sand, however, aids with the conduction of heat energy out and away from the fuse element weak spots and reduces mechanical stress and strain to mitigate load current cycling fatigue that may otherwise result. The sodium silicate mechanically binds the sand to the fuse element, terminal and housing increasing the thermal conduction between these materials. Less heat is generated in the weak spots and the onset of mechanical strain is accordingly retarded.

Figure 11:
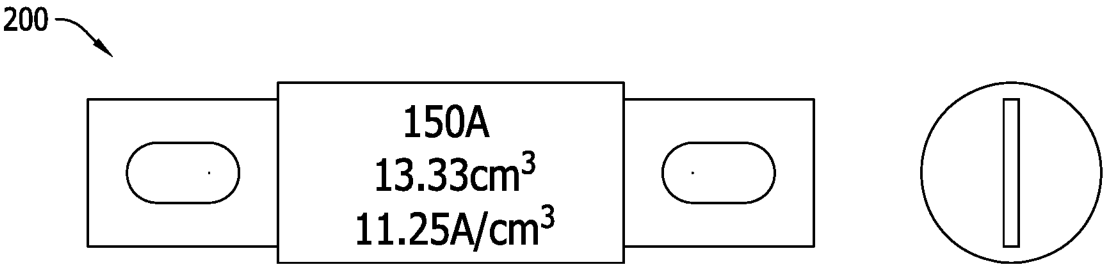
FIG. 11 illustrates a power density of a first version of a power fuse formed in accordance with FIGS. 2-8.

FIG. 11 illustrates a first version of the fuse 200 engineered to provide a 500 VDC voltage rating and a 150 A current rating. As seen in FIG. 11, the fuse has a volume of 13.33 $cm^3$ and a power density, defined herein as fuse amperes per unit volume of (150 A/13.33 $cm^3$) or 11.25 $A/cm^3$.

Figure 12:
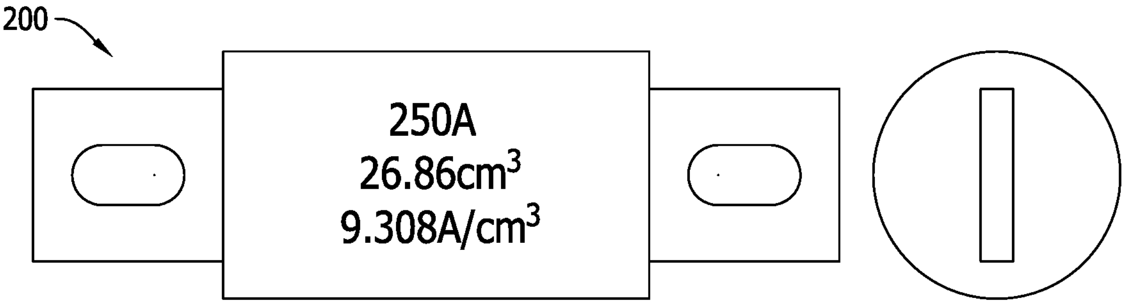
FIG. 12 illustrates a power density of a second version of a power fuse formed in accordance with FIGS. 2-8.

FIG. 12 illustrates a second version of the fuse 200 engineered to provide a 500 VDC voltage rating and a 250 A current rating. As seen in FIG. 12, the increased ampacity rating necessitates a larger fuse than the fuse shown in FIG. 11. The fuse has a volume of 26.86 $cm^3$ and a power density of 250 A/26.86 $cm^3$ or 9.308 $A/cm^3$.

Figure 13:
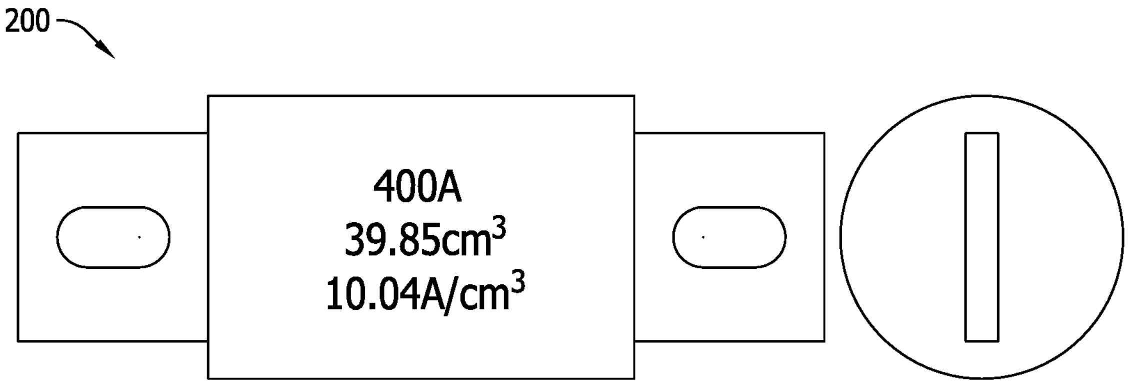
FIG. 13 illustrates a power density of a third version of a power fuse formed in accordance with FIGS. 2-8.

FIG. 13 illustrates a third version of the fuse 200 engineered to provide a 500 VDC voltage rating and a 400 A current rating. As seen in FIG. 13, the increased ampacity rating necessitates a larger fuse than the fuse shown in FIG. 12. The fuse has a volume of 39.85 $cm^3$ and a power density of 400 A/39.85 $cm^3$ or 9.308 $A/cm^3$.

Regardless of the current rating, the fuse 200 exhibits significantly higher power densities relative to standard available power class fuses having similar ratings as demonstrated in Table 2 below.

TABLE 2

| | Power Density Fuse Amperes per Unit Volume ($cm^3$) | | | |
|---|---|---|---|---|
| Rating | Fuse 200 | UL Class T | UL Class J | UL Class R |
| 150A | 11.25 | 6.04 | 4.61 | 0.5 |
| 250A | 9.31 | 4.07 | 1.27 | 0.32 |
| 400A | 10.04 | 6.51 | 2.04 | 0.52 |

The astute reader will recognize the higher power density of the fuse 200 relative to the UL Class T, UL Class J and UL Class R fuses of similar ratings is a reflection of the reduction in size of the fuse 200 versus the UL Class T, UL Class J and UL Class R fuses of the same rating. The fuse 200 at each rating is a but a fraction of the size of conventional fuses operable to interrupt comparable power circuitry.

The features described above can be used to achieve reductions in the size of fuses having a given rating as demonstrated above, or alternatively to increase the ratings of a fuse having a certain size. In other words, by implementing the features described above, whether separately or in combination, the power density of a fuse having a given size can be increased and higher ratings can be obtained. For example, the power density of the conventional fuse shown in FIG. 1 can be increased to provide a higher rated fuse with similar size.

While exemplary current ratings of fuses 200 are set forth above, it is understood that still other current ratings and ampacities are possible in other embodiments, and if obtained may result in still further variations of power density. Fuses of different ampacity may be achieved by increasing or decreasing the cross-sectional area of the weak spots, varying the fuse element geometry, increasing or decreasing the effective length of the fuse element, and varying the size of the housing and terminals accordingly. Further, while the fuses 200 described have a 500V voltage rating, other voltage ratings are possible and may be achieved with similar modification to the components of the fuse.

Figure 14:
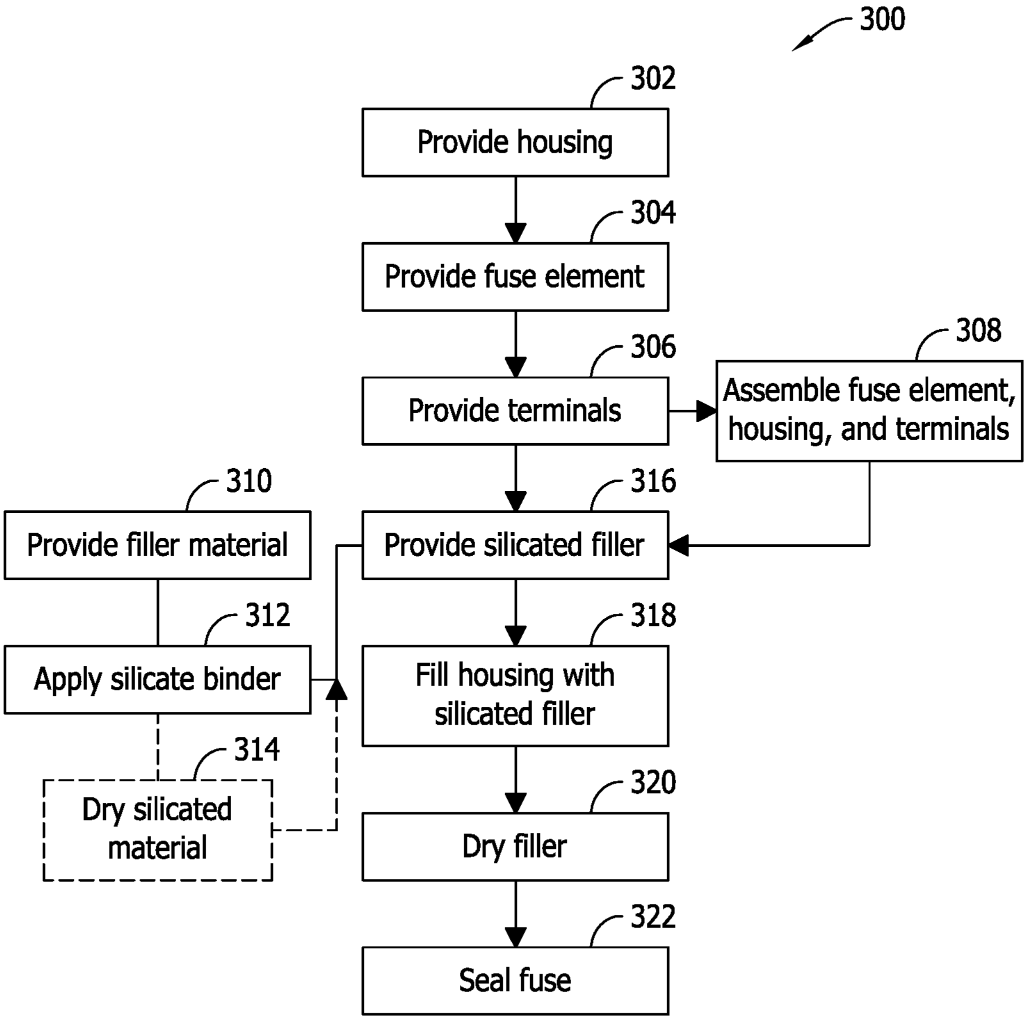
FIG. 14 is a flowchart of a first exemplary method of manufacturing the exemplary power fuse shown in FIGS. 2-8.

FIG. 14 illustrates a flowchart of an exemplary method 300 of manufacturing the high voltage power fuse 200 described above.

The method includes providing the housing at step 302. The housing provided may correspond to the housing 202 described above.

At step 304, at least one fuse element is provided. The at least one fuse element may include the fuse element assembly 208 described above.

At step 306, fuse terminals are provided. The fuse terminals may correspond to the terminal blades 204, 206 described above.

At step 308, the components provided at steps 302, 304 and 306 may be assembled partially or completely as a preparatory step to the remainder of the method 300.

As further preparatory steps, a filler material is provided at step 310. The filler material may be a quartz sand material as described above. Other filler materials are known, however, and may likewise be utilized.

At step 312, a silicate binder is applied to the filler material provided at step 310. In one example, the silicate binder may added to the filler material as a sodium silicate liquid solution. Optionally, the silicate material may be dried at step 314 to remove moisture. The dried silicate material may then be provided at step 316.

At step 318, the housing may be filled with the silicate filler material provided at step 316 and loosely compacted in the housing around the fuse element. Optionally, the filler is dried at step 320. The fuse is sealed at step 322 to complete the assembly.

Figure 15:
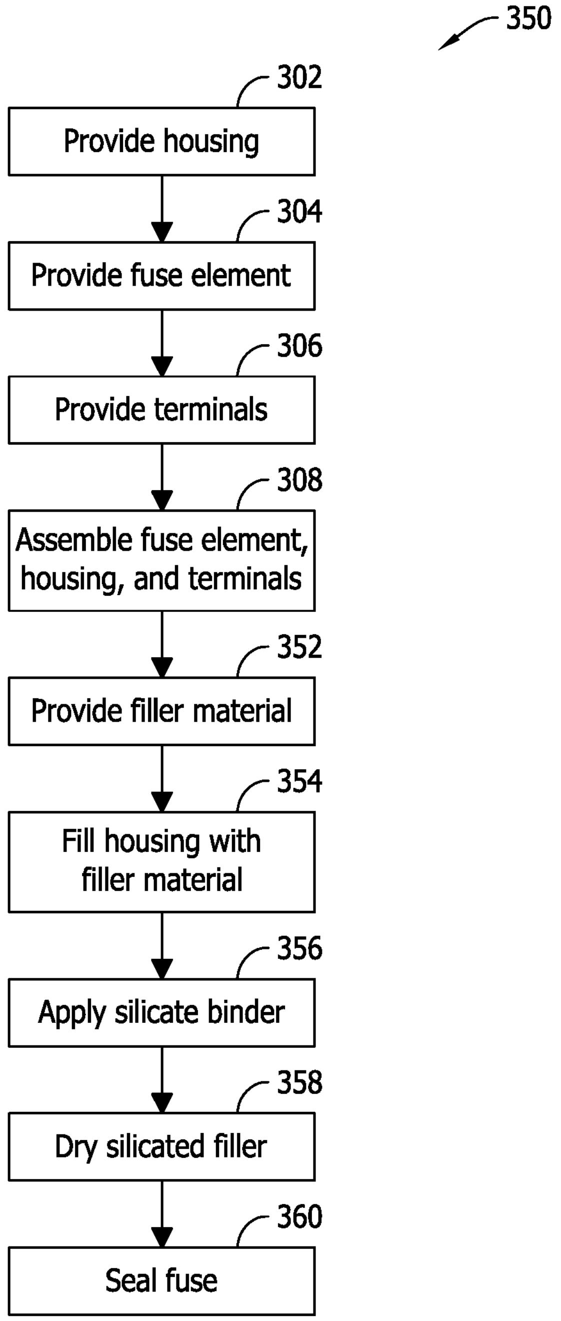
FIG. 15 is a flowchart of a second exemplary method of manufacturing the exemplary power fuse shown in FIGS. 2-8.

FIG. 15 illustrates another flowchart of another exemplary method 350 of manufacturing the power fuse 200. The preparatory steps 304, 306, 308 are the same as those described above for the method 300.

At step 352, a filler material such as quartz sand is provided. At step 354 the housing is filled with the filler material provided and loosely packed around the fuse element(s) in the assembly of step 308.

At step 356 the silicate binder is applied. The silicate binder may be added to the filler after being placed in the housing. This may be accomplished by adding a liquid sodium silicate solution through the fill hole(s) provided in the end caps 226, 228 as explained above. Steps 354 and 365 may be alternately repeated until the housing is full of filler and silicate binder in the desired amount and ratios.

At step 358, the silicated filler is dried to complete the mechanical and thermal conduction bonds. The fuse may be sealed at step 360 by installing the fill plugs 234 described above.

Using either method 300 or 350, the thermal conduction bonds are established between the filler particles, the fuse element(s) in the housing, any connecting terminal structure such as the end plates 226, 228 and contacts 222, 224 described above. The silicate filler material provides an effective heat transfer system that cools the fuse elements in use and facilitates the greater power density described above.

Figure 16:
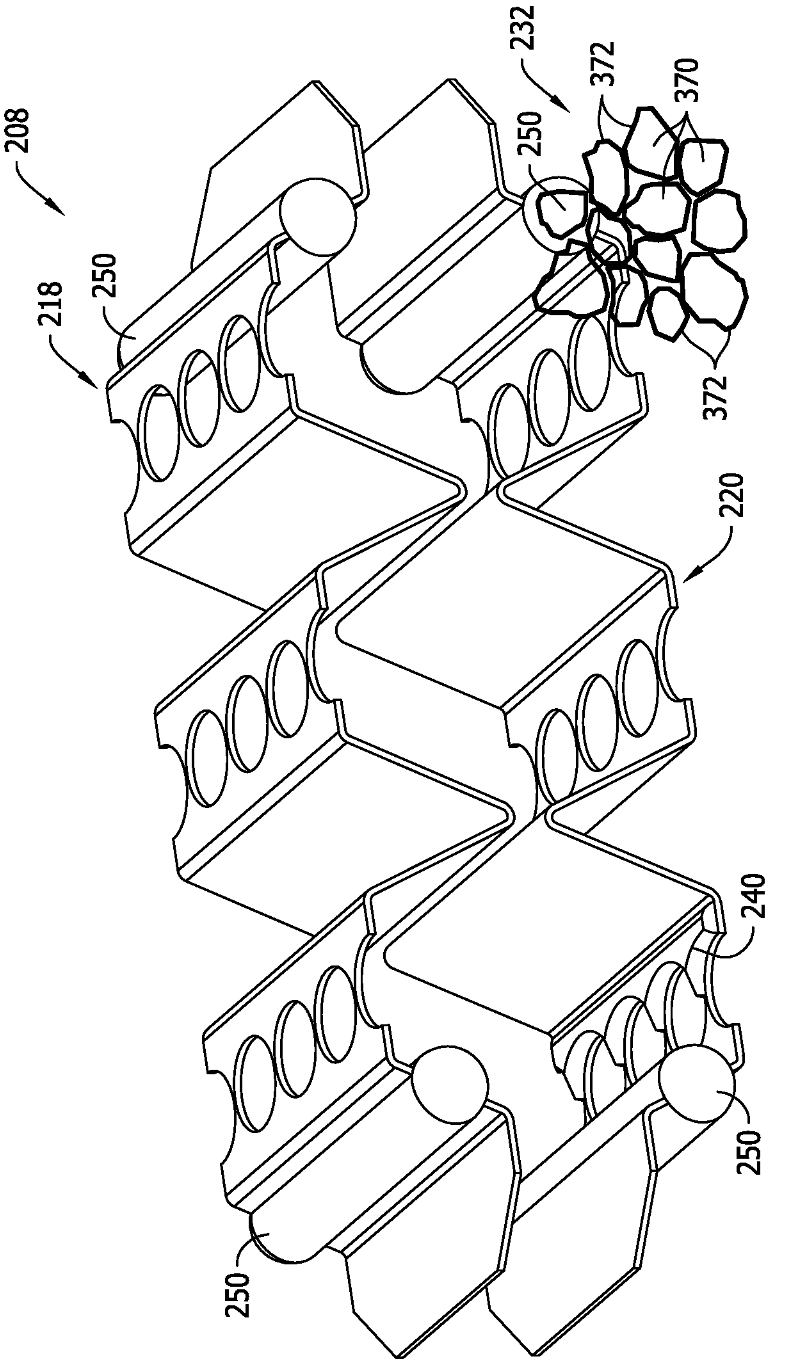
FIG. 16 partially illustrates a bonding of the silicate filler material for the power fuse shown in FIGS. 2-8.

As partly shown in FIG. 16, the particles 370 of filler material (quartz sand in this example) are mechanically bonded together with the silicate binder 372 (sodium silicate in this example), and the silicate binder 372 further mechanically bonds the filler material particles 370 to the surfaces of the fuse elements 218 and 220. The binder 372 further mechanically bonds the filler material particles 370 to the surfaces of end plates 226, 228 and terminal contacts 222, 224, as well as to the interior surfaces of the housing 202. Such inter-bonding of the elements is much more effective to transfer heat than conventionally applied non-silicated filler materials that merely establish point contact when loosely compacted in the housing of a fuse. The increased effectiveness of the thermal conduction bonds established by the silicated filler particles allows the fuse elements 218, 220 to withstand higher voltage, and higher current conditions than otherwise would be possible.

Figure 17:
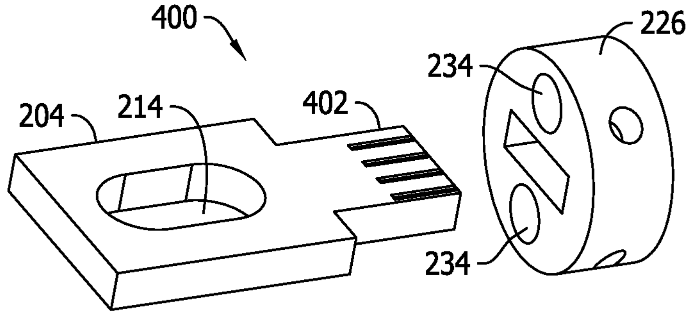
FIG. 17 is a perspective view of an exemplary terminal fabrication assembly for the power fuse shown in FIG. 2.

FIG. 17 is a perspective view of an exemplary terminal fabrication assembly 400 for the power fuse 200 shown in FIG. 2. In the example shown, the terminal assembly 400 includes the terminal 204 and the end plate 226 formed as separately provided and independently fabricated pieces from a material such as that described above. The terminal 204 is shown to include a connector portion 402 that is received in an aperture 404 formed in the end plate 226. Thus, after the terminal piece 204 and the end plate piece 226 are each respectively formed using known formation techniques, the connector portion 402 is passed through the aperture 404 in the end plate 226 and the two pieces are then mechanically and electrically joined to one another by a known technique, including but not limited to welding and soldering processes. The two piece assembly 400 provides an economical assembly relative to an embodiment wherein the terminal and end plate are fabricated as a single piece.

When the two piece assembly 400 is assembled, the connector portion 402 passes completely though the end plate 226 and the connector portion 402 extends from the opposite side of the end plate 226 from which it is inserted. In such an arrangement, the connector portion 402 of the terminal 204 of the terminal piece extends on one side of the end plate 226 while the terminal blade including the aperture 214 extends from the opposite side. As such, the connector portion 402 when assembled to the end plate 226 effectively functions as the contact block 222 (shown in FIG. 5) that in turn connects to one end of the fuse element assembly 208. In another embodiment, however, the contact block 222 may be provided on the end plate 226, or in still another embodiment the contact block 222 may be provided as a third piece that could be assembled with a separately fabricated and provided terminal piece and end plate.

While one terminal assembly 400 is shown including the terminal 204 and end plate 226, another terminal assembly 400 may be provided to serve as the end plate 228 and the terminal 206 that is coupled to an opposing end of the fuse 200 from the terminal 400 as shown. That is, the power fuse 200 may be constructed with substantially identical terminal assemblies 400 on the opposing ends of the fuse housing 202 with the fuse element assembly 208 connected in between. In another embodiment, the terminal assemblies could be different from one another on the opposing ends of the fuse housing 202 if desired, although this would likely increase the costs of manufacture.

FIGS. 18A, 18B, 18C and 18D illustrate exemplary stages of manufacture of the power fuse 200 including the terminal assembly 400 shown in FIG. 17. These Figures more specifically illustrate the method steps shown in steps 302 through 308 shown in FIGS. 14 and 15.

Figure 18A:
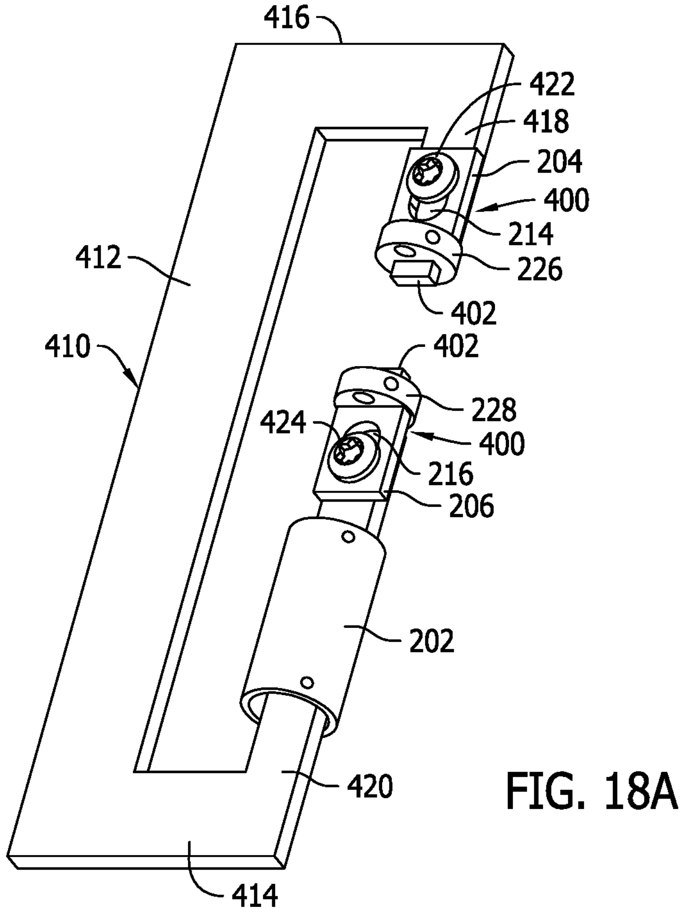
FIGS. 18A, 18B, 18C and 18D illustrate exemplary stages of manufacture of the power fuse shown in FIG. 2.

In FIG. 18A, an assembly frame 410 is provided including a longitudinal main section 412, lateral sections 414, 416 extending perpendicularly from the main section 412 at either end thereof, and assembly legs 418, 420 extending parallel to the main section 412 and toward one another from respective ends of the lateral sections 414, 416. Because of its visual resemblance, the assembly frame 410 is sometimes referred to as a C-frame. In the example shown, the assembly leg 420 is longer than the assembly leg 418, and a gap extends between the ends of the assembly legs 418, 420 to facilitate the assembly of the fuse 200 as explained next.

In FIG. 18A, the fuse housing 202 is shown extending over the longer assembly leg 420 of the frame 410. Terminal assemblies 400 are assembled as described above and attached to the respective assembly legs 418, 420. In the embodiment illustrated, the assembly legs 418, 420 of the assembly frame 410 include apertures that accept fasteners 424 that are passed through the apertures 214, 216 in the terminal blades 204, 206. For example, the fasteners 426 may be screws which may mated with respective nuts on the opposite side of the assembly legs 418, 420. When the nuts are tightened, the terminal blades 204, 206 are clamped to the respective assembly legs 418, 420. As also shown in FIG. 18A, the connector portions 402 in each terminal assembly 400 are facing one another and are aligned with one another. A gap extends between the connector portions 402 in which the fuse element assembly 208 may be fabricated. The gap is predetermined to accommodate the effective length of the fuse assembly 208 but not more.

Figure 18B:
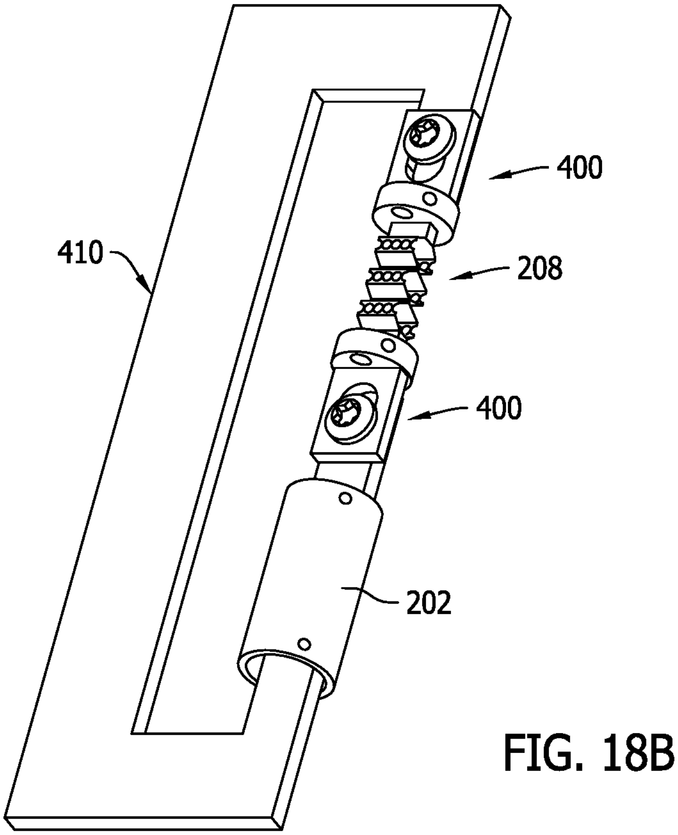

FIG. 18B shows the fuse element assembly 208 constructed between the terminal assemblies 400. The terminal tabs 246 (FIG. 7) of the fuse elements described above are mechanically and electrically joined to the connector portions 402 (FIG. 18A) of the terminal assemblies 400.

Figure 18C:
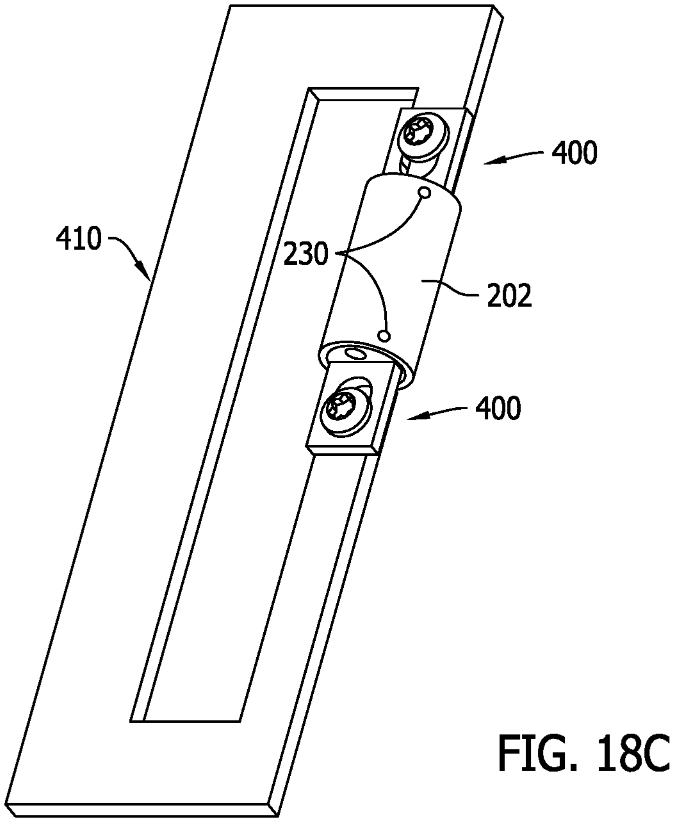

In FIG. 18C, the housing 202 is slidably moved from its initial position (FIG. 18A) on the assembly leg 420 to its final position enclosing the fuse element assembly 208. The housing 202 may be secured in place via the pins 230 (also shown in FIG. 4) in contemplated embodiments. As mentioned above, however, the housing 202 may alternatively be secured in position via alternative techniques known in the art as desired. The remainder of the method shown in FIG. 14 or 15 regarding the application of the silicated filler material and sealing of the fuse may then be completed after the fuse housing 202 is in place.

Figure 18D:
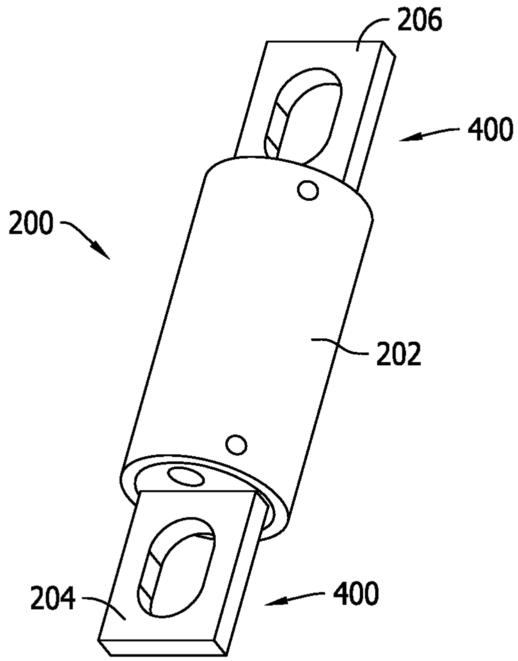

FIG. 18D shows the completed power fuse 200 removed from the assembly frame 410. The fasteners 422, 424 (FIG. 18A) are easily removed to separate the fuse 200 from the assembly frame 410. The separation from the assembly frame 410 may occur after the silicated filler application is complete, after sealing of the fuse is complete, or at any point prior. That is, the application of the silicated filler and the sealing of the fuse may occur in whole or in part while the assembly is separated from the assembly frame 410.

Figure 19:
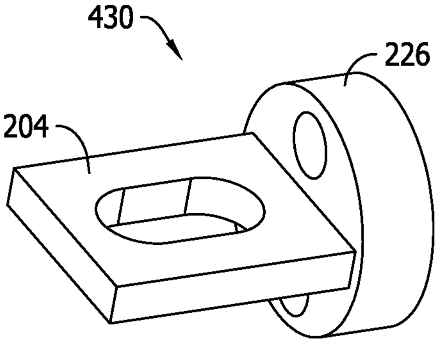
FIG. 19 is a perspective view of an alternative terminal fabrication for the power fuse shown in FIG. 2.

FIG. 19 is a perspective view of an alternative terminal fabrication 430 for the power fuse 200. As shown in FIG. 19, the fabrication 430 includes one piece of material that is machined to include the terminal 204, the end plate 226 and the contact block 222 (not shown in FIG. 19). The single piece fabrication is more expensive to produce than the two piece fabrication shown in FIG. 17 on a component level, but simplifies the assembly of the fuse 200 by omitting any need to assemble and fasten the two piece terminal assembly via soldering or welding. The one piece terminal fabrication 430 can be substituted for the two piece fabrication 400 in FIGS. 18A, 18B, 18C and 18D to construct the fuse 200 with a reduced number of steps.

The higher component cost of the one piece terminal fabrication 430 can be offset by the lower assembly cost that it allows. The one piece fabrication 430 further provides performance benefits relative to the two piece fabrication 400 described above, namely reduced electrical resistance and improved heat flow in the assembled fuse 200. In combination with the other features described above, the improved heat flow and reduced resistance of the one piece terminal fabrication 430 allows the physical size of the fuse to be reduced while still capably performing at elevated current and voltages in applications such as those described above.

Figure 20:
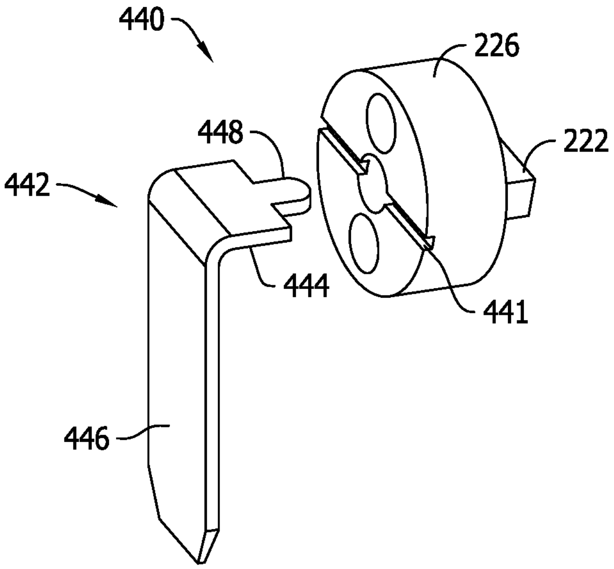
FIG. 20 is a perspective view of an alternative terminal fabrication assembly to the assembly shown in FIG. 17.

FIG. 20 is a perspective view of an alternative terminal fabrication assembly 440 to the terminal fabrication assembly 400 shown in FIG. 17. Like the assembly 400, the assembly 440 includes two pieces fabricated separately and independently from materials such as those described above.

The first piece in the terminal fabrication assembly 440 may be recognized as the end plate 226 that is formed to include the contact block 222. That is, the end plate 226 and the contact block 222 are fabricated from a single piece of material that is machined into the shape as shown. The end plate 226 is formed with a slot 441 extending diametrically across the round face of the end plate 226 in the example shown. The slot 441 receives a portion of the second terminal piece described below.

The second terminal piece 442 is shown in FIG. 20 as a blade terminal having a first section 444 extending in a first plane and a second section 446 extending in a section plane that is perpendicular to the first plane. As such, the blade terminal 442 includes a right angle bend such that the terminal blade 442 is L-shaped. The first section 444 is axially shorter than the second section 446. The distal end 448 of the first section 444 includes a tab in the example shown that facilitates mechanical and electrical connection with the end plate 226 when the distal end 448 is inserted in the slot 441 and the two pieces are joined using welding or soldering techniques in contemplated embodiments. It is also seen in FIG. 20 that the slot 441 is wider than the section 444 that it receives when the pieces are joined.

Figure 21:
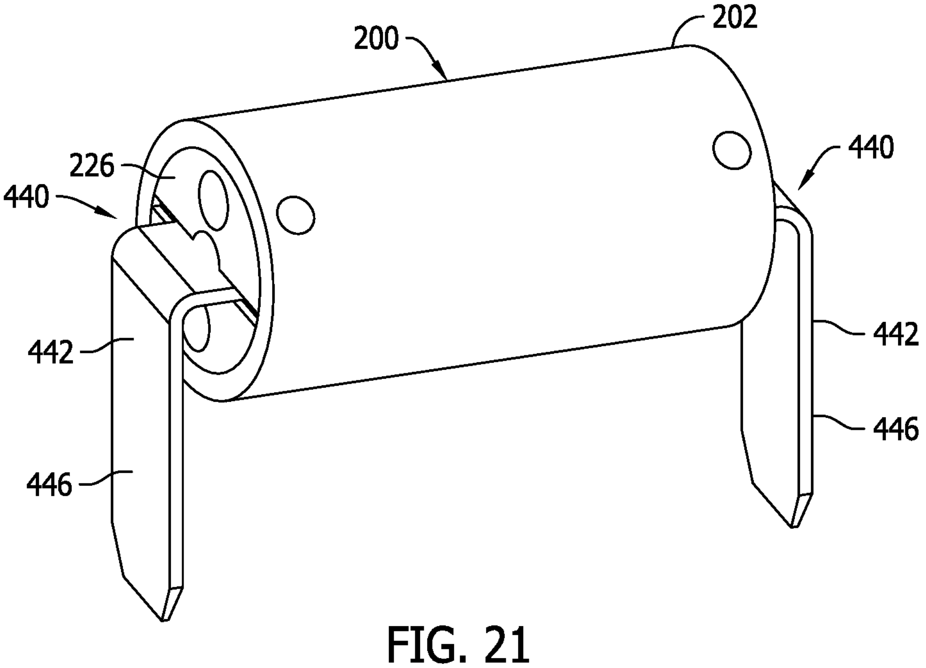
FIG. 21 is a perspective view of the terminal fabrication assembly shown in FIG. 20 installed to the power fuse.

While one terminal assembly 440 is shown including the terminal 442 and end plate 226 in FIG. 20, another terminal assembly 440 may be provided to include the end plate 228 and similar terminal 442 that may be assembled and coupled to an opposing end of the fuse 200 as shown in FIG. 21. That is, the power fuse 200 may be constructed with substantially identical terminal assemblies 440 on the opposing ends of the fuse housing 202 with the fuse element assembly 208 connected in between. In another embodiment, the terminal assemblies could be different from one another on the opposing ends of the fuse housing 202 if desired, although this would likely increase the costs of manufacture.

As seen in FIG. 21, the blade portions 446 extend in a generally spaced apart but parallel relationship to one another on the opposing ends of the fuse housing 202. This terminal arrangement may sometimes be preferred by EV manufacturers over the blade terminals 204, 206 shown in FIGS. 2-6 and 17-18.

Figure 22:
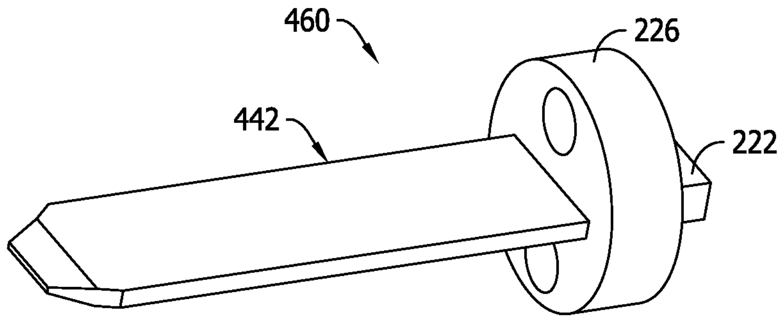
FIG. 22 is a perspective view of an alternative terminal fabrication to that shown in FIG. 20.

FIG. 22 is a perspective view of an alternative terminal fabrication 460 to the assembly 440 shown in FIGS. 20 and 21. Similar to the fabrication 430 shown in FIG. 19, the fabrication 460 includes one piece of material that is machined to include the terminal 442, the end plate 226 and the contact block 222. The single piece fabrication is more expensive to produce than the two piece fabrication shown in FIG. 20 on a component level, but simplifies the assembly of the fuse 200 by omitting any need to assemble and fasten the two piece terminal assembly via soldering or welding. The one piece terminal fabrication 460 can be substituted for the two piece fabrication 430 to construct the fuse 200 with a reduced number of steps.

The higher component cost of the one piece terminal fabrication 460 can be offset by the lower assembly cost that it allows. The one piece fabrication 460 further provides performance benefits relative to the two piece fabrication 430 described above, namely reduced electrical resistance and improved heat flow in the assembled fuse. In combination with the other features described above, the improved heat flow and reduced resistance of the one piece terminal fabrication allows the physical size of the fuse 200 to be reduced while still capably performing at elevated current and voltages in applications such as those described above.

FIGS. 23A, 23B, 23C, 23D and 23E illustrate exemplary stages of manufacture of a power fuse 200 including the terminal fabrication 460 shown in FIG. 22. These Figures more specifically illustrate the method steps shown in steps 302 through 308 shown in FIGS. 14 and 15.

Figure 23A:
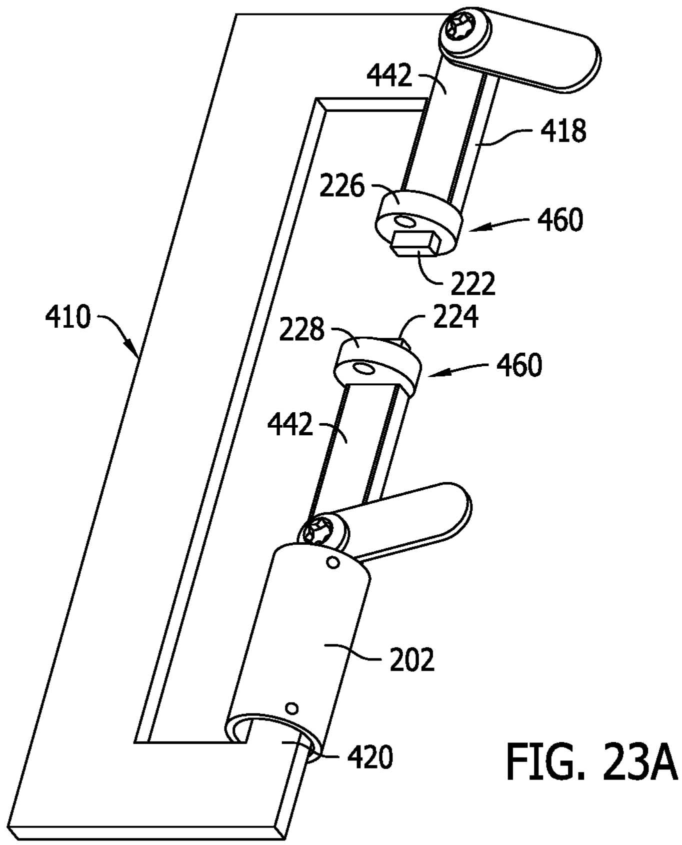
FIGS. 23A, 23B, 23C, 23D and 23E illustrate exemplary stages of manufacture of a power fuse including the terminal structure shown in FIG. 22.

In FIG. 23A, the assembly frame 410, sometimes referred to as a C-frame, is provided as described above in relation to FIG. 18A. In FIG. 23A, the fuse housing 202 is shown extending over the longer assembly leg 420 of the frame 410. Terminal fabrications 460 are formed as a single piece as described above and are attached to the respective assembly legs 418, 420 of the assembly frame 410 with known fasteners. As also shown in FIG. 23A, the contact blocks 222, 224 in each terminal fabrication 460 face one another and are aligned with one another. A gap extends between the contact blocks 222, 224 in which the fuse element assembly 208 may be fabricated. The gap is predetermined to accommodate the effective length of the fuse assembly 208 but not more.

Figure 23B:
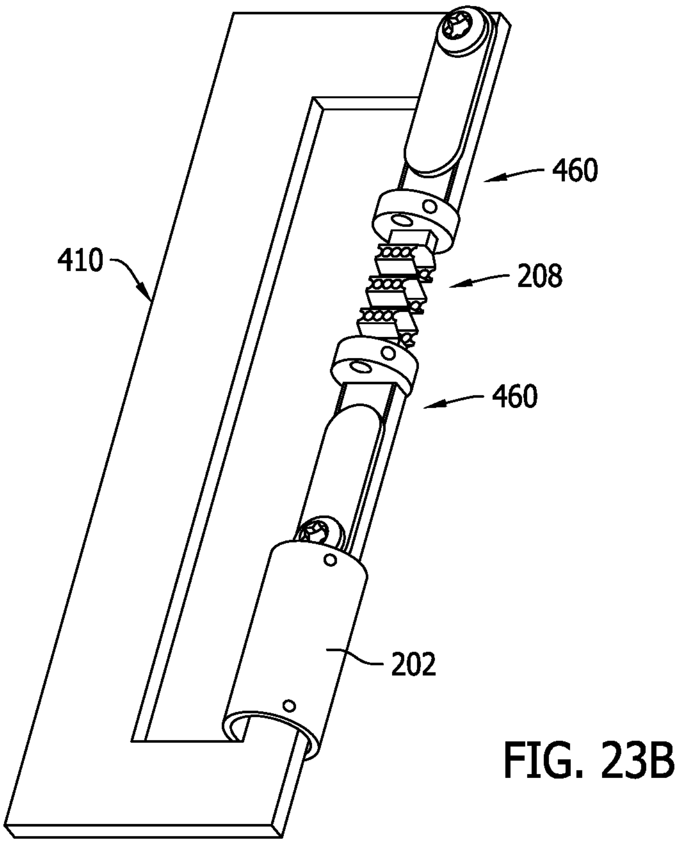

FIG. 23B shows the fuse element assembly 208 constructed between the terminal fabrications 460. The terminal tabs 246 (FIG. 7) of the fuse elements described above are mechanically and electrically joined to the contact blocks 222, 224 (FIG. 23A) of the terminal fabrications 460.

Figure 23C:
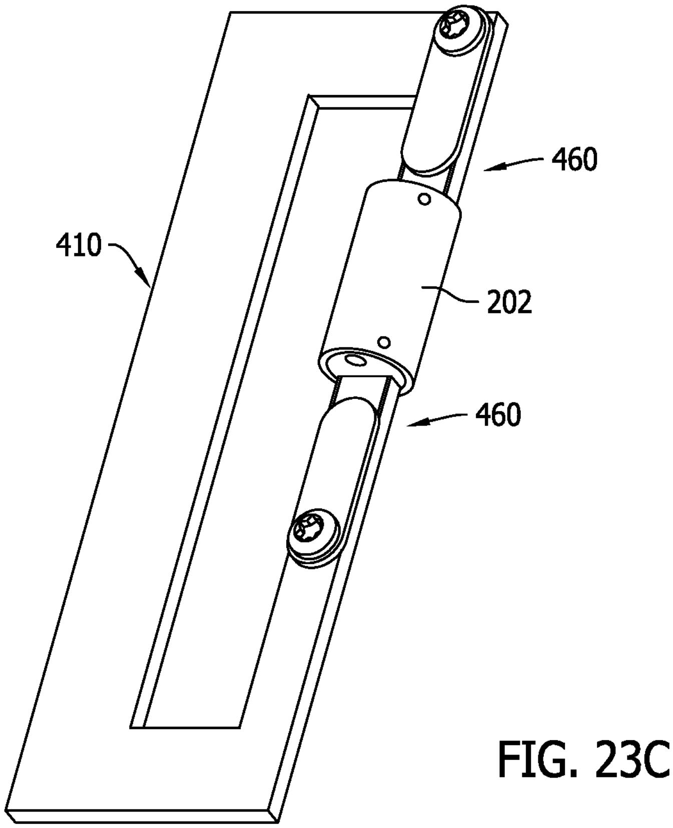

In FIG. 23C, the housing 202 is slidably moved from its initial position (FIG. 23A) on the assembly leg 420 of the frame 410 to its final position enclosing the fuse element assembly 208. The housing 202 may be secured in place via the pins 230 (also shown in FIG. 4) in contemplated embodiments. As mentioned above, however, the housing 202 may alternatively be secured in position via alternative techniques known in the art as desired. The remainder of the method shown in FIG. 14 or 15 regarding the application of the silicated filler material and sealing of the fuse may then be completed after the fuse housing 202 is in place.

Figure 23D:
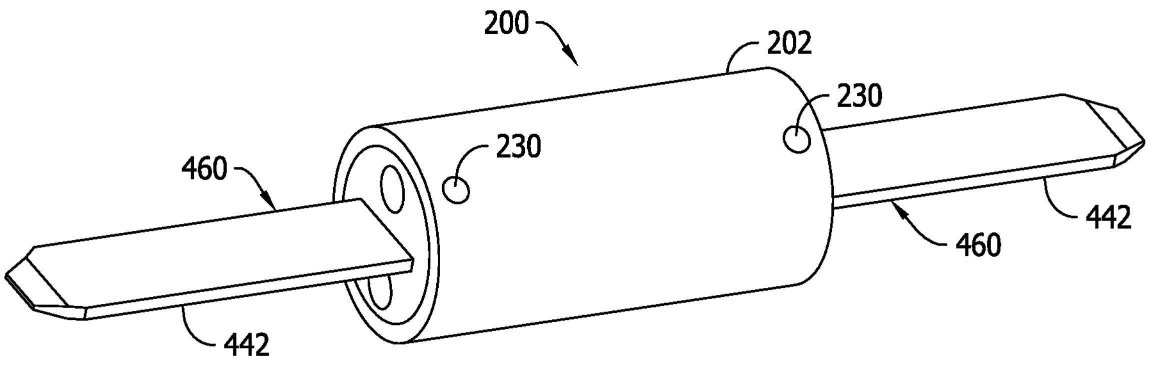

FIG. 23D shows the completed power fuse 200 removed or separated from the assembly frame 410. The separation from the assembly frame 410 may occur after the silicated filler application is complete, after the sealing of the fuse is complete, or at any point prior. That is, the application of the silicate filler and the sealing of the fuse may occur in whole or in part while the assembly is separated from the assembly frame 410.

Figure 23E:
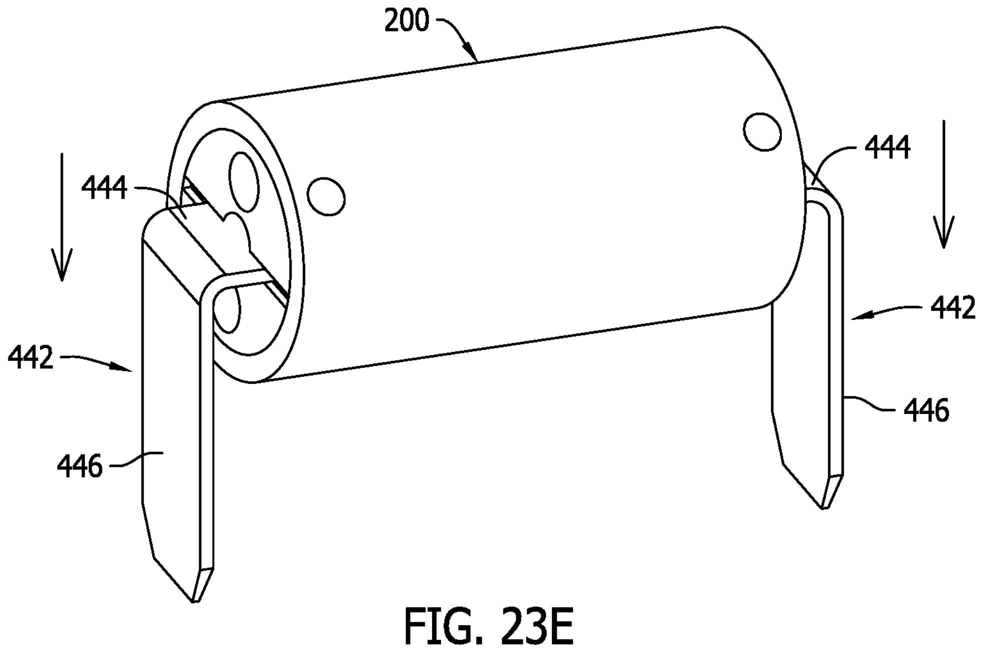

FIG. 23E illustrates the terminals 442 in each terminal fabrication 460 being bent to define the section 446 extending perpendicularly from the section 444. That is, the terminals 442 are shaped to include a right angle bend. The fuse 200 is now complete and ready for use. It is contemplated that in some embodiments the terminals 442 may be bent in advance and this step may then be omitted. In such embodiments where the terminals 442 are bent in advance, a different assembly frame 410 may be required to manufacture the fuse 200 in an economical fashion.

The benefits of the inventive concepts disclosed are now believed to have been amply demonstrated in relation to the exemplary embodiments disclosed.

An embodiment of a power fuse has been disclosed including: a housing; first and second terminal fabrications coupled to the housing, each of the terminal fabrications comprising an end plate and a terminal and each of the terminal fabrications being one of a single piece and a two piece assembly; at least one fuse element extending internally in the housing and between the first and second terminal fabrications; and a filler surrounding the at least one fuse element in the housing, wherein the filler is mechanically bonded to the fuse element assembly.

Optionally, the terminal may be a blade terminal. The blade terminal may include a right angle bend. The blade terminal may include an aperture. The terminal fabrication may include a single piece, and the filler may include sodium silicated sand.

The at least one fuse element may optionally include a short circuit fuse element and an overload fuse element. The short circuit fuse element and the overload fuse element may be substantially identically formed fusible elements arranged in the housing as mirror images of one another. Each of the short circuit fuse element and the overload fuse element may include a plurality of substantially co-planar sections separated by a plurality of oblique sections. Each of the plurality of substantially co-planar sections may include a plurality of apertures defining a plurality of weak spots. At least a portion of the overload fuse element may be provided with an M-effect treatment. At least a portion of the short circuit fuse element and at least a portion of the overload element may be provided with an arc barrier material.

The fuse may optionally have a voltage rating of at least 500 VDC. The housing may be cylindrical and may have an axial length of about 1.5 inches to about 3 inches. The fuse may have a current rating of at least 150 A, at least 250 A, or at least 400 A. The fuse may exhibit a power density of at least 9.0 A/cm3. The fuse may exhibit a power density of about 11.25 A/cm3.

An embodiment of a full-range power fuse has also been disclosed including: a housing including opposed first and second ends; first and second end plates coupled to the respective first and second ends; first and second terminals extending from the respective first and second end plates; a full-range fuse element assembly extending internally in the housing and connected to a respective one of the end plates; a filler surrounding the at least one fuse element in the housing, wherein the filler is mechanically bonded to the fuse element assembly, the housing, and the first and second terminals; and wherein at least the first end plate and the first terminal are defined by a single piece fabrication.

Optionally, the first terminal may include a terminal blade. The terminal blade may include a right angle bend. The first end plate includes a contact block, with the fuse element assembly being connected to the contact block. The filler may include sodium silicated sand. The full-range fuse assembly may be provided with an arc barrier material. The fuse element assembly may have a voltage rating of at least 500 VDC. The non-conductive housing may be cylindrical, and the cylindrical housing may have an axial length of about 1.5 inches to about 3 inches. The fuse element assembly may have a current rating in a range of about 150 A to about 400 A. The fuse may exhibit a power density of at least about 9.0 $A/cm^3$ to at least about 11.0 $A/cm^3$.

A method of manufacturing a high voltage power fuse utilizing an assembly frame, the frame having first and second assembly legs and the fuse including a housing, a full-range fuse element assembly, and first and second terminal fabrications. The method includes: inserting the housing over the first assembly leg of the assembly frame; assembling the first terminal fabrication to the first assembly leg of the assembly frame; assembling the second terminal fabrication to the second assembly leg of the assembly frame; connecting the full-range fuse element assembly in a gap between the first terminal and the second terminal; sliding the housing over the full-range assembly; securing the housing in position to enclose the full-range fuse element assembly; and applying a silicated filler material to the assembled housing, full-range fuse element, and first and second terminals to establish a mechanical bond between the silicated filler material and the assembled housing, full-range fuse element, and first and second terminals.

Optionally, assembling the first terminal fabrication to the first assembly leg of the assembly frame may include providing a single piece terminal fabrication including an end plate and a terminal, and attaching the terminal to the first assembly leg of the assembly frame. Assembling the second terminal fabrication to the second assembly leg of the assembly frame may also include: assembling a first terminal piece defining a terminal to a second terminal piece defining an end plate; and securing the first terminal piece of the second assembly leg of the assembly frame.

Each of the first and terminal fabrications may optionally include a terminal blade, with the method further including forming a right angle bend in at least one of the terminal blades.

Applying a silicated filler material may include adding a silicate binder to a filler material. Adding the silicate binder to the filler material may include adding the silicate binder to quartz sand. Adding the silicate binder to silica sand may include applying a sodium silicate binder to quartz sand. Adding the silicate binder to the filler material may include adding a liquid solution of silicate binder to form a mixture of the filler material and the silicate binder. The method may further include drying the mixture.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing a high voltage power fuse comprising:

connecting a full-range fuse element assembly across a gap between a first terminal fabrication and a second terminal fabrication, the full-range fuse element assembly including first and second metal strip fuse elements defining a plurality of weak spots therein and being connected in parallel to one another, the first metal strip fuse element configured to respond to a short circuit current condition and the second metal strip fuse element configured to respond to an overload current condition;

configuring a first set of arc barriers at a first set of locations to surround respective cross sectional portions of the first metal strip fuse element and a second set of arc barriers at a second set of locations to surround respective cross sectional portions of the second metal strip fuse element, wherein the first and second sets of arc barriers are configured to prevent arcing from reaching the first and second terminal fabrications during an opening of the full-range fuse element assembly at one or more of the plurality of weak spots of the first and second metal strip fuse elements, wherein the first set of arc barriers that are configured at the first set of locations separate the first metal strip fuse element from the first and second terminal fabrications, and wherein the second set of arc barriers that are configured at the second set of locations separate the second metal strip fuse element from the first and second terminal fabrications;

enclosing the full-range fuse element assembly, the first set of arc barriers, and the second set of arc barriers in a housing after the full-range fuse element is connected and after the first set of arc barriers are configured and the second set of arc barriers are configured;

introducing a silicated filler material mixture to the housing to surround and bond to an exposed surface of the full-range fuse element assembly not covered by the first set of arc barriers and the second set of arc barriers and further to a portion of each of the first and second terminal fabrications inside the housing; and drying the silicated filler material mixture.

2. The method of claim 1, wherein each of the first and second terminal fabrications includes an end plate and a contact block provided on the end plate;

wherein connecting a full-range fuse element assembly across a gap between a first terminal fabrication and a second terminal fabrication includes directly attaching opposing ends of the first and second metal strip fuse elements to the contact block of each of the first and second terminal fabrication.

3. The method of claim 1, wherein each of the first and second terminal fabrications includes a terminal blade, the method further comprising forming a right angle bend in at least one of the terminal blades.

4. The method of claim 1, wherein each of the first and second terminal fabrications includes an end plate and a terminal blade, the method further comprising:

passing an end of the terminal blade through an opening in the end plate; and directly attaching opposing ends of the first and second metal strip fuse elements to the end of the terminal blade.

5. The method of claim 1, wherein each of the first and second terminal fabrications includes an end plate and a terminal blade, the terminal blades each including apertures formed therein; the method further comprising:

fastening each of the terminal blades in the first and second terminal fabrication, via the apertures in the terminal blades, to respective ones of opposing legs of a C-shaped assembly frame; and connecting the full-range fuse element assembly across the gap between a first terminal fabrication and a second terminal fabrication while the terminal blades are fastened to the respective ones of opposing legs of the C-shaped assembly frame.

6. The method of claim 5, further comprising:

prior to fastening of the terminal blades in the first and second terminal fabrication to respective ones of opposing legs of the C-shaped assembly frame, sliding the housing over one of the opposing legs of the C-shaped assembly frame;

connecting the full-range fuse element assembly across the gap with the housing in place over one of the opposing legs of the C-shaped assembly frame;

after the full-range fuse element assembly is connected, sliding the housing over the one of the opposing legs of the C-shaped assembly frame and over the connected full-range fuse element assembly; and securing the housing to the first and second terminal fabrications to enclose the full-range fuse element assembly.

7. The method of claim 6, wherein introducing the silicated filler material mixture to the housing is performed while the terminal blades in the first and second terminal fabrication are fastened to the respective ones of opposing legs of the C-shaped assembly frame.

8. The fuse produced by the method of claim 1, wherein the housing has a compact axial length of about 1.5 inches to about 3 inches, the fuse has a voltage rating of at least 500 VDC and a current rating of 150 A to 400 A, and the fuse has a power density of about 9.0 A/cm to A/$cm^3$ to about 11.25 A/$cm^3$.

* * * * *